United States Patent
Zhang et al.

(10) Patent No.: US 12,250,677 B2
(45) Date of Patent: Mar. 11, 2025

(54) CONTROL SIGNALING FOR UPLINK FREQUENCY SELECTIVE PRECODING

(71) Applicant: APPLE INC., Cupertino, CA (US)

(72) Inventors: Yushu Zhang, Beijing (CN); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Seyed Ali Akbar Fakoorian, San Diego, CA (US); Wei Zeng, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 349 days.

(21) Appl. No.: 17/811,997

(22) Filed: Jul. 12, 2022

(65) Prior Publication Data

US 2023/0094010 A1    Mar. 30, 2023

Related U.S. Application Data

(60) Provisional application No. 63/261,590, filed on Sep. 24, 2021.

(51) Int. Cl.
*H04W 72/1268*    (2023.01)
*H04B 7/06*    (2006.01)
(Continued)

(52) U.S. Cl.
CPC ...... *H04W 72/1268* (2013.01); *H04B 7/0639* (2013.01); *H04L 5/0051* (2013.01); *H04W 72/23* (2023.01)

(58) Field of Classification Search
CPC .......... H04W 72/1268; H04W 72/23; H04W 72/232; H04B 7/0639; H04B 7/0404;
(Continued)

(56) References Cited

U.S. PATENT DOCUMENTS

2017/0311296 A1    10/2017    Onggosanusi et al.
2021/0126681 A1 *    4/2021    Huang ................ H04W 72/23
(Continued)

FOREIGN PATENT DOCUMENTS

WO    WO-2018108247 A1 *    6/2018    .......... H03M 13/095

OTHER PUBLICATIONS

Huawei, HiSilicon, "Codebook based transmission for UL MIMO", R1-1715584, 3GPP TSG RAN WG1 NR ad-Hoc#3, Nagoya, Japan, Agenda Item 6.2.1.2, Sep. 18-21, 2017, 10 pages.

*Primary Examiner* — Ayanah S George
(74) *Attorney, Agent, or Firm* — Dorsey & Whitney LLP

(57) ABSTRACT

Systems and methods using control signaling for uplink frequency selective precoding at a user equipment (UE) are disclosed herein. A base station may indicate a transmission rank indicator (TRI), a wideband transmission precoder matrix indicator (TPMI), and one or more subband TPMI(s) to the UE. The base station may indicate, to the UE, whether to use the wideband TPMI or a subband TPMI to precode a physical uplink shared channel (PUSCH) transmission from the UE to the base station. The UE then precodes (and transmits) the PUSCH accordingly. Methods of UE application of the indicated subband TPMI(s) to subbands of the bandwidth in which a PUSCH may be transmitted are described. Methods accounting for a UE capability as to non-coherent, partial-coherent, and/or coherent precoding are described. Methods of assigning TPMI(s) to subbands in view of multiple transmission reception point (TRP) use by the UE for UE transmission are described.

20 Claims, 14 Drawing Sheets

(51) Int. Cl.
*H04L 5/00* (2006.01)
*H04W 72/23* (2023.01)

(58) Field of Classification Search
CPC ... H04B 7/0417; H04L 5/0051; H04L 5/0057; H04L 5/0044; H04L 5/0094
See application file for complete search history.

(56) References Cited

U.S. PATENT DOCUMENTS

| | | | |
|---|---|---|---|
| 2022/0015039 A1* | 1/2022 | Huang | H04B 7/0404 |
| 2023/0066978 A1* | 3/2023 | Li | H04B 7/066 |
| 2023/0422271 A1* | 12/2023 | Tang | H04L 1/1896 |

* cited by examiner

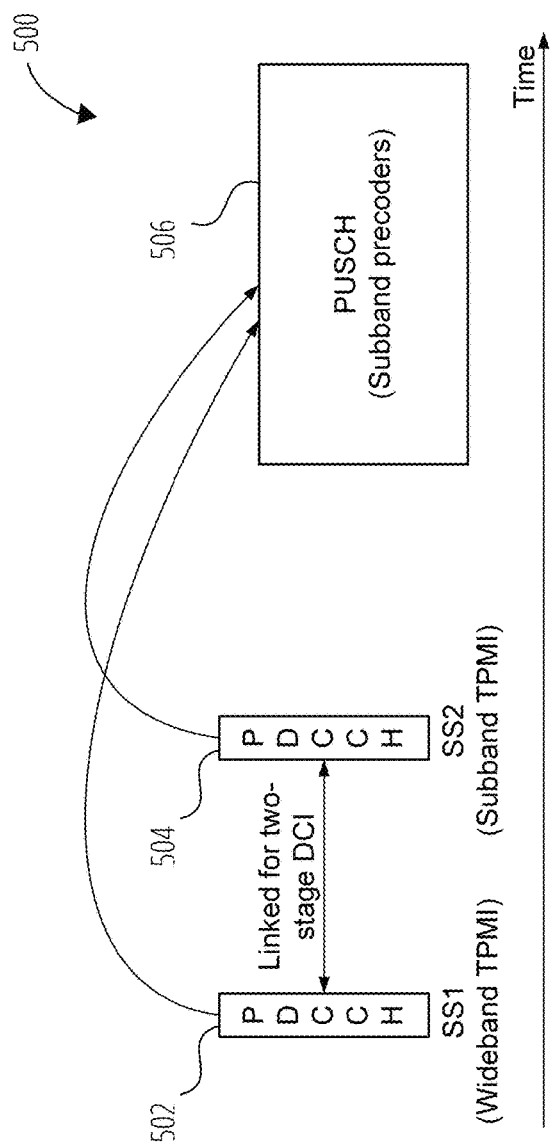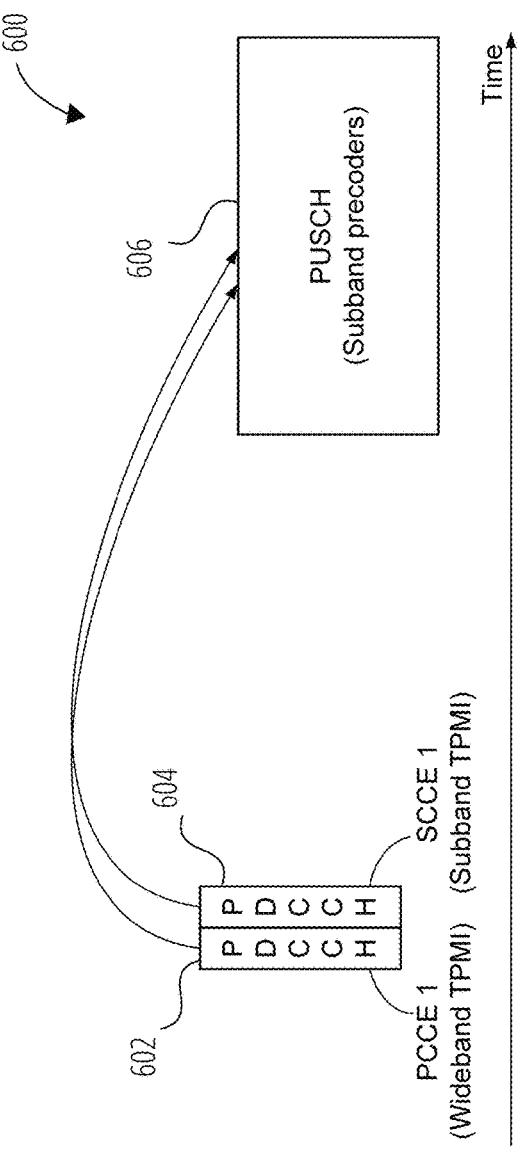
FIG. 5
FIG. 6

CONTROL SIGNALING FOR UPLINK FREQUENCY SELECTIVE PRECODING

TECHNICAL FIELD

This application relates generally to wireless communication systems, including wireless communications systems implementing uplink frequency selective precoding at a user equipment (UE).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a diagram showing a use of subband TPMIs when a two-stage DCI is sent across linked search spaces, according to an embodiment.

FIG. 6 illustrates a diagram showing a use of subband TPMIs when a two-stage DCI is sent across multiple CCE sets of an SS, according to an embodiment.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

In some wireless communications systems, codebook-based precoding for uplink transmission is supported for the case of transmissions by a UE to a single transmission reception point (TRP) (a "single-TRP mode") and to multiple TRPs (a "multi-TRP mode").

To facilitate UE transmission according to a single-TRP mode, a base station may indicate each of a transmission rank indicator (TRI) and a transmission precoder matrix indicator (TPMI) the UE. The UE may then use the TRI to identify a set of precoder matrices that correspond to (are for) to a transmission rank indicated by or associated with the TRI. Further, the UE may use the provided TPMI to identify a particular precoder matrix (also sometimes referred to herein as more simply a "precoder") from that set. The UE may then precode a corresponding uplink (UL) transmission (e.g., to be sent on a physical uplink shared channel (PUSCH)) using the assigned precoder. In such cases, the precoder may be used in a wideband fashion (e.g., the UL transmission precoder is used for any UL transmission on an entire scheduled bandwidth for such UL transmission).

To facilitate UE transmission according to a multi-TRP mode, a base station may indicate a TRI, as described. Further, the UE may indicate a TPMI for each of the TRPs to which the UE is to transmit in the multi-TRP mode. Each such TPMI may correspond to a precoder for a transmission direction as between the UE and the respective TRP. As the various TRPs may be in different transmission directions from the UE, the precoders may accordingly be different. The UE applies the precoders to the PUSCH transmissions to each TRPs on a per-TRP basis.

It is contemplated that for PUSCH(s) sent according to a dynamic grant (DG), the TRI indication and the TPMI indication(s) can be indicated by the downlink control information (DCI) scheduling the PUSCH. For PUSCH(s) sent according to a configured grant (CG), the TRI indication and the TPMI indication(s) can be as configured by radio resource control (RRC).

Figure 1:
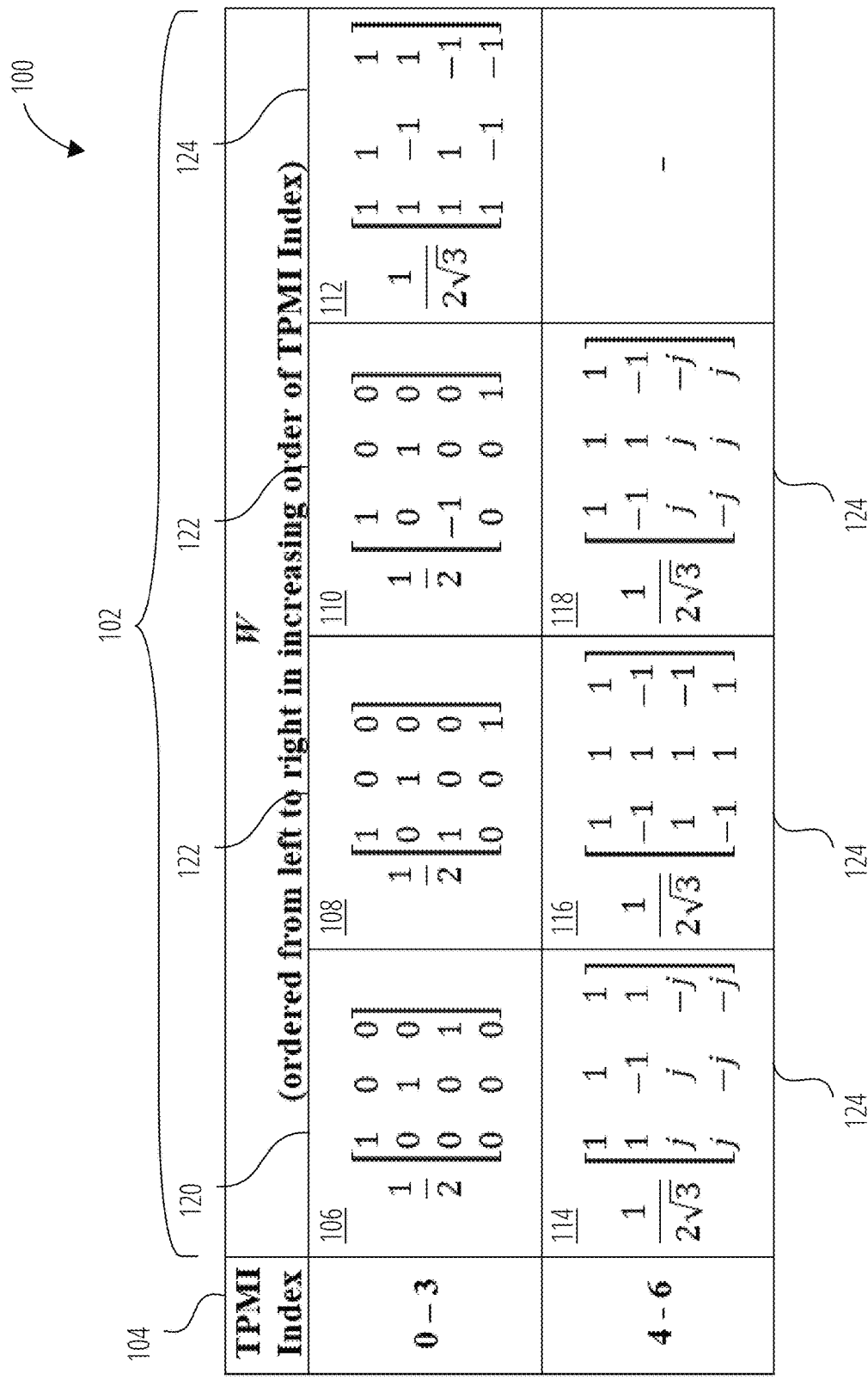
FIG. 1 illustrates a portion of a codebook corresponding to rank 3 transmissions, according to an embodiment

A codebook may contain the precoders, and may be used with the TRI indication and the TPMI indication(s) to identify the appropriate precoders by the base station and/or at the UE. FIG. 1 illustrates a portion 100 of a codebook corresponding to rank 3 transmissions, according to an embodiment. The portion 100 of the codebook is for use when TRI=3. In this codebook, there are seven precoders 102 available in the codebook with this TRI.

A UE may be capable of performing one or more of non-coherent precoding, partial-coherent precoding, and/or coherent precoding. In non-coherent precoding, the UE does not control for phase alignment as between any various UE antenna ports represented by the precoder. In partial-coherent precoding, the UE controls for phase alignment as between subsets of the various UE antenna ports (e.g., as between pairs of antenna ports), but does not control for phase alignment as between the entire set of antenna ports. In coherent precoding, the UE controls for phase alignment as between the entire set of antenna ports. Controlling for phase alignment between two or more antenna ports allows the UE to "split" a rank across those "coherent" ports according to the precoder selected for transmission. This may allow for more complex precoders (and thus better control or tuning of transmission direction(s) used by the UE) over the non-coherent case.

As illustrated, within the precoders 102, the first precoder 106 is a non-coherent precoder 120, the second precoder 108 and the third precoder 110 are partial-coherent precoders 122 (that implement phase alignment between first and third antenna ports, allowing the second precoder 108 and the third precoder 110 to be more complex than non-coherent precoders), and the fourth precoder 112, the fifth precoder 114, the sixth precoder 116, and the seventh precoder 118 are coherent precoders 124 (that leverage phase alignment as between all four antenna ports, allowing the fourth precoder 112, the fifth precoder 114, the sixth precoder 116, and the to be more complex than non-coherent precoders and partial-coherent precoders). Each of the precoders 102 corresponds to a TPMI index 104 that can be used to indicate (e.g., by the base station to the UE, as described above) one of the precoders 102.

In some cases, a UE may be capable of using non-coherent precoding. In other cases, a UE may be capable of using non-coherent precoding and/or partial-coherent precoding. In other cases, a UE may be capable of using non-coherent precoding, partial-coherent precoding, and/or coherent precoding. In whichever instance, the UE may indicate to the base station its supported codebook type(s) (e.g., supported precoder type(s)) with UE capability signaling. The base station may then configure a codebook subset based on the UE capability to the UE using RRC signaling. For example, a codebookSubset information element may be used by the base station to indicate the nature of the codebook subset to the UE, thereby keeping a corresponding understanding of the codebook under use at both the UE and the base station. Going forward, the codebook subset is what is then used with the TRI/TPMI indication scheme discussed previously.

A UE may perform UL transmissions (e.g., PUSCH transmissions) within an assigned frequency bandwidth (e.g., that is bounded by a configured part (BWP)). In some cases, it may be that the UE is configured to use an assigned precoder with all such transmissions of this (entire) bandwidth. This may be understood to be a use of a "wideband precoder." A TPMI identifying a wideband precoder may be understood to be a "wideband TPMI."

However, it may be beneficial to support frequency selective precoding within subbands of this (entire) bandwidth. For example, it may be that the use of a first precoder within a first subband and a second precoder with a second subband results in better overall throughput (e.g., due to specific, differing channel conditions at each subband) than simply using the same precoder corresponding to each subband. This may be understood to be a use of "subband precoders." A TPMI identifying a subband precoder (e.g., as corresponding to a given subband of the (entire) bandwidth) may be understood to be a "subband TPMI."

Figure 2:
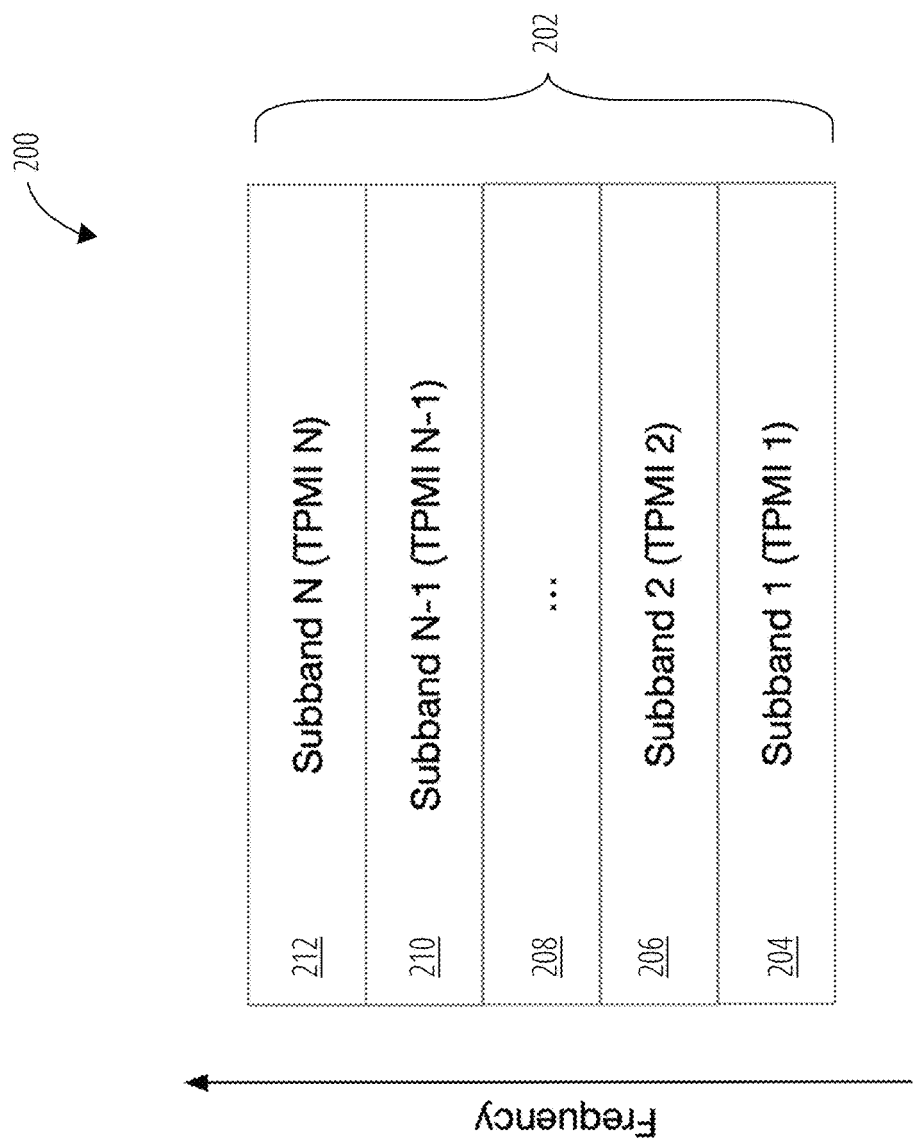
FIG. 2 illustrates a subband TPMI arrangement, according to an embodiment.

FIG. 2 illustrates a subband TPMI arrangement 200, according to an embodiment. It may be that a bandwidth 202 for an uplink (e.g., PUSCH) transmission by the UE is divided into a first subband 204, a second subband 206, additional subband(s) 208, an N-1st subband 210, and an Nth subband 212.

It is contemplated that a base station may indicate (in addition to a TRI and a wideband TPMI) a subband TPMI for each of the one or more of the subbands 204 through 212 within the bandwidth 202. Then, each portion of the PUSCH that is scheduled to use the bandwidth 202 may be precoded using a subband precoder identified by a one of the subband TPMIs that corresponds to the subband carrying that portion of the PUSCH.

In relation to the use of configured grants, it may be that the TRI, the wideband TPMI, and/or the subband TPMI(s) are indicated to the UE in RRC. In relation to the use of dynamic grants, it may be that the TRI, the wideband TPMI, and/or the subband TPMI(s) are indicated to the UE in DCI scheduling.

In some cases, it may be that RRC configuration information can be used to indicate whether, for a PUSCH to be sent, a precoder corresponding to a wideband TPMI or a plurality of precoders corresponding to a plurality of subband TPMIs (corresponding to subbands used to transmit the PUSCH) are to be used. In some embodiments, an RRC parameter can be used to enable/disable the use of the subband TPMIs (as opposed to the wideband TPMI). For example, the RRC parameter may be sent in a binary field used for indicating whether the transmission should be precoded with a precoder corresponding to a subband TPMIs or to a wideband TPMI. In some embodiments, an RRC parameter may indicate a number of TPMIs that are configured. In these cases, when the value is 1, it is understood by the UE that the RRC configured TPMI is a wideband TPMI.

In some examples, the UE may apply the use of a wideband TPMI or subband TPMIs to transmissions within a particular BWP used by the UE, in the manner configured by an RRC parameter. In some examples, the UE may apply the use of a wideband TPMI or subband TPMIs to transmissions to a particular serving cell, in the manner configured by an RRC parameter. In some examples, the UE may apply the use of a wideband TPMI or subband TPMIs to transmissions between a UE and a particular serving cell group (SCG), in the manner configured by an RRC parameter. In some examples, the UE may apply the use of a wideband TPMI or subband TPMIs to all transmissions made by the UE, in the manner configured by an RRC parameter.

Figure 3:
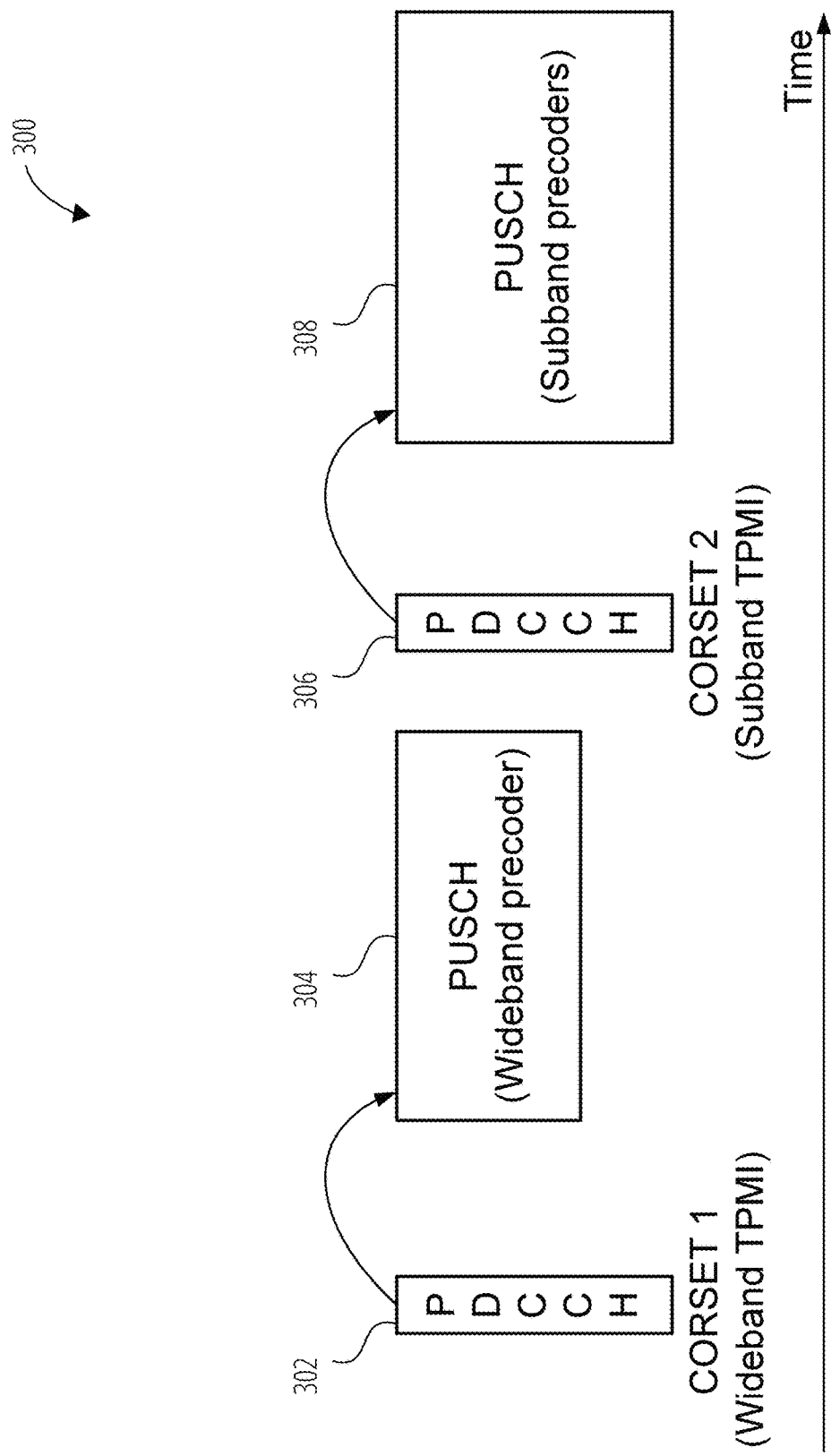
FIG. 3 illustrates diagram showing a use of a wideband TPMI or subband TPMIs corresponding to an associated CORESET, according to an embodiment.

In some examples, the UE may apply the use of the wideband TPMI or the subband TPMIs to a use of a particular control resource set (CORESET), in a manner configured by an RRC parameter. FIG. 3 illustrates diagram 300 showing a use of a wideband TPMI or subband TPMIs corresponding to an associated CORESET, according to an embodiment. A first physical downlink control channel (PDCCH) 302 scheduling a first PUSCH 304 (e.g., via DCI sent of the first PDCCH 302) is sent by a base station to a UE. The first PDCCH 302 may be received at the UE in a first CORESET. The first CORESET may correspond to the wideband TPMI (e.g., as configured by an RRC parameter). Accordingly, the UE precodes the first PUSCH 304 scheduled by the first PDCCH 302 with a wideband precoder (the precoder identified by the wideband TPMI) prior to sending the first PUSCH 304.

A second PDCCH 306 scheduling the second PUSCH 308 (e.g., via DCI of the second PDCCH 306) is sent by the base station to the UE. The second PDCCH 306 may be received at the UE in a second CORESET. The second CORESET may correspond to the subband TPMIs (e.g., as configured by an RRC parameter). Accordingly, the UE precodes the second PUSCH 308 scheduled by the second PDCCH 306 with subband precoders (the precoders identified by the subband TPMIs) prior to sending the second PUSCH 308, with each subband use for the transmission of the second PUSCH 308 using the corresponding subband precoder indicated by the corresponding subband TPMI.

In some examples, the UE may apply the use of the wideband TPMI or the subband TPMIs to a particular search space (SS) as configured by an RRC parameter. For example, upon receiving a PDCCH that schedules a PUSCH, a determination of whether a wideband precoder (a precoder identified by the wideband TPMI) or subband precoders (precoders identified by the subband TPMIs) are to be used to precode the PUSCH may be based on whether the PDCCH is received in an SS associated with the use of the wideband TPMI or the subband TPMIs, as configured by the RRC parameter.

In some cases, it may be that medium access control control element (MAC CE) information can be used to configure whether, for a PUSCH to be sent, a precoder corresponding to a wideband TPMI or precoders corresponding to subband TPMIs are to be used to precode a transmission. For example, the MAC CE information may be sent in order to change or update a previous configuration by an RRC parameter, as described above. It may be that these MAC CE driven changes can be implemented more quickly than changes using a follow-up or updated RRC configuration.

Figure 4:
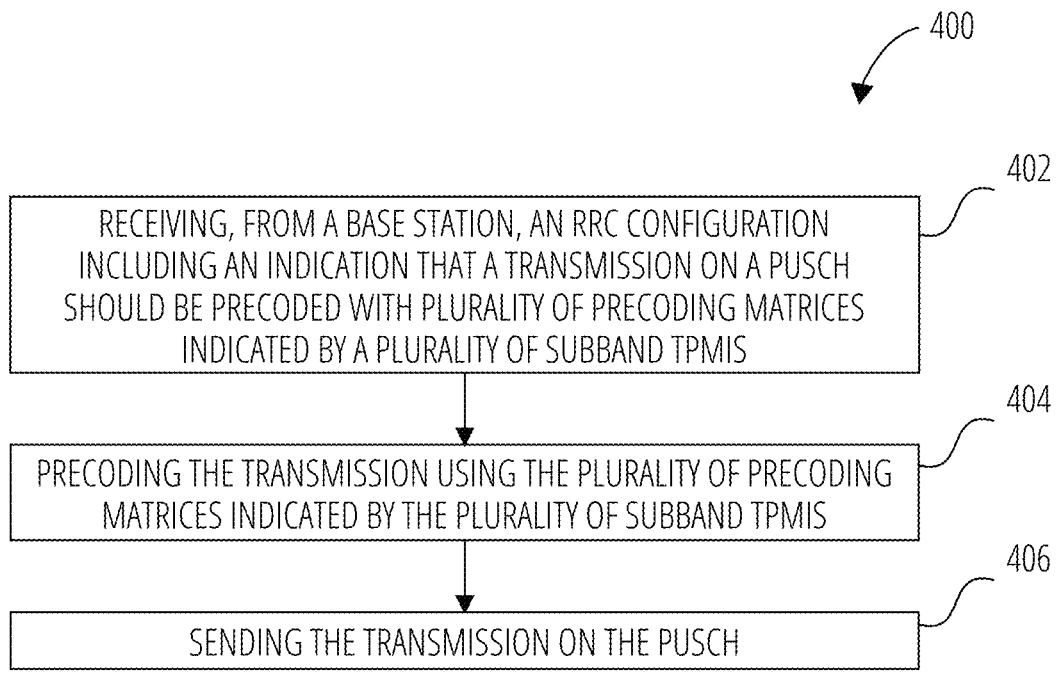
FIG. 4 illustrates a method of a UE, according to an embodiment.

FIG. 4 illustrates a method 400 of a UE, according to an embodiment. The method 400 includes receiving 402, from a base station, an RRC configuration including an indication that a transmission on a PUSCH should be precoded with plurality of precoding matrices indicated by a plurality of TPMIs.

The method 400 further includes precoding 404 the transmission using the plurality of precoding matrices indicated by the plurality of subband TPMIs.

The method 400 further includes sending 406 the transmission on the PUSCH.

In some embodiments of the method 400, the indication is provided in a binary field for whether the transmission should be precoded with the plurality of precoding matrices or with a second precoding matrix indicated by a wideband TPMI.

In some embodiments of the method 400, the indication is provided as a number of TPMIs available for use at the UE.

In some embodiments of the method 400, the RRC configuration further identifies a bandwidth part (BWP) to which the indication that the transmission should be precoded with the plurality of precoding matrices applies, and the PUSCH is sent in the BWP.

In some embodiments of the method 400, the RRC configuration further identifies a serving cell for which the indication that the transmission should be precoded with the plurality of precoding matrices applies, and the PUSCH is sent on the serving cell.

In some embodiments of the method 400, the RRC configuration further identifies a serving cell group for which the indication that the transmission should be precoded with the plurality of precoding matrices applies, and the PUSCH is sent on a cell of the serving cell group.

In some embodiments of the method 400, the RRC configuration further identifies the UE to indicate that the indication that the transmission should be precoded with the plurality of precoding matrices applies at the UE.

In some embodiments of the method 400, the RRC configuration further identifies a CORESET for which the indication that the transmission should be precoded with the plurality of precoding matrices applies, and a PDCCH scheduling the transmission is received in the CORESET.

In some embodiments of the method 400, the RRC configuration further identifies an SS for which the indication that the transmission should be precoded with the plurality of precoding matrices applies, and a PDCCH scheduling the transmission is received in the SS.

In some embodiments, the method 400 further includes receiving a MAC CE updating the indication.

In some embodiments of the method 400, the plurality of subband TPMIs is provided in DCI that schedules the transmission.

In some embodiments of the method 400, the plurality of subband TPMIs is provided via RRC signaling.

In some embodiments of the method 400, the UE is capable of performing coherent transmission, and wherein the plurality of precoding matrices includes a coherent precoding matrix.

In some embodiments of the method 400, is capable of performing partial-coherent transmission, and wherein the plurality of precoding matrices includes a partial-coherent precoding matrix.

In some embodiments of the method 400, the transmission is sent on a plurality of subbands corresponding to the plurality of subband TPMIs.

Embodiments contemplated herein include an apparatus comprising means to perform one or more elements of the method 400. This apparatus may be, for example, an apparatus of a UE (such as a wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 1606 of a wireless device 1602 that is a UE, as described herein).

Embodiments contemplated herein include an apparatus comprising logic, modules, or circuitry to perform one or more elements of the method 400. This apparatus may be, for example, an apparatus of a UE (such as a wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 1602 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 1604 of a wireless device 1602 that is a UE, as described herein). These instructions may be, for example, located in the processor and/or on a memory of the UE (such as a memory 1606 of a wireless device 1602 that is a UE, as described herein).

In some cases, it may be that DCI can be used to indicate whether, for a PUSCH scheduled by the DCI, a precoder corresponding to a wideband TPMI or precoders corresponding to the subband TPMIs are to be used.

It is contemplated that there are cases where the DCI provides the indication whether to use the wideband TPMI or the subband TPMIs in the context of the use of two-stage DCI. In cases of two-stage DCI, it may be that a first stage DCI of the two-stage DCI is used to provide the wideband TPMI (itself) to the UE along with the indication of whether to use the wideband TPMI or the subband TPMIs, and that a second stage DCI of the two-stage DCI is used to provide the subband TPMIs to the UE.

In a corresponding two-stage DCI execution context, upon receiving and beginning to decode the DCI, a UE determines whether a decoded portion of the DCI represents a first stage DCI of two-stage DCI. For example, the decoded portion of the DCI may indicate that a second stage DCI for the DCI exists. This may inform the UE that the (entire) DCI is a two-stage DCI, and thus that the decoded portion of the DCI is the first stage DCI of that two-stage DCI. This first stage DCI may include information for the UE that allows it to then proceed to locate and decode the second stage DCI of the two-stage DCI.

Alternatively, it may be that as the UE receives and decodes the DCI, it determines that there is no second stage DCI (thus, the DCI includes only the first stage DCI and is not two-stage DCI)

The use of the wideband TPMI or subband TMPIs can correspondingly be triggered by the DCI by leveraging this context. For example, the UE may use decoded first-stage DCI to determine whether the second-stage DCI exists. If second stage DCI does exist, the UE uses the first-stage DCI to determine whether subband precoders indicated by subband TPMIs of the second-stage DCI should be used to precode the PUSCH scheduled by the two-stage DCI (or whether the UE should instead, e.g., use the wideband precoder for a wideband TPMI received in the first-stage DCI to precode the PUSCH). The PUSCH is then accordingly precoded and sent. In cases where the second-stage DCI does not exist, the wideband precoder indicated in the first stage DCI may be used to precode the PUSCH.

In some embodiments, first stage DCI may include a field indicating whether the scheduled PUSCH should be precoded using a precoder corresponding to the wideband TPMI (provided by the first stage DCI) or precoders corresponding to subband TPMIs (provided by the second stage DCI). In some embodiments, this field may be a one-bit indicator provided in the first stage DCI.

In some embodiments, first stage DCI may include a reserved value for an (e.g., existing) field of the DCI indicating whether the scheduled PUSCH should be precoded using a precoder corresponding to the wideband TPMI (provided by the first stage DCI) or precoders corresponding to subband TPMIs (provided by the second stage DCI). In some embodiments, a reserved value may be a value of a demodulation reference signal (DMRS) antenna port indication found in the first stage DCI.

In some embodiments, first stage DCI may be sent on a PDCCH having a starting control channel element (CCE) index that is associated with a use of precoder corresponding to a wideband TPMI (provided by the first stage DCI) or precoders corresponding to subband TPMIs (provided by the second stage DCI). In other words, the use of the wideband precoder or the subband precoders may turn on a determination made at the UE regarding the starting CCE index. In some cases, this determination may be relative to a value of the starting CCE index. For example, the UE may use the subband precoders (identified by the subband TPMIs) if the starting CCE index is odd or the wideband precoder (identified by the wideband TPMI) if the starting CCE index is even (or vice-versa).

In some embodiments, first stage DCI may be sent with cyclic redundancy check (CRC) bits that have been scrambled using a radio network temporary identifier (RNTI) that is configured to indicate between the use of a precoder corresponding to the wideband TPMI (provided by the first stage DCI) or precoders corresponding to subband TPMIs (provided by the second stage DCI). This RNTI may be termed a TPMI-C-RNTI. This RNTI may be associated with a PDCCH on which the DCI is sent. It may be that if the UE determines to use the subband precoders (identified by the subband TPMIs) in the case that the CRC bits of the DCI have been scrambled using this RNTI, and/or determines to use the wideband precoder (identified by the wideband TPMI) in the case that the CRC bits of the DCI have not been scrambled using this RNTI (or vice-versa).

Note that because the wideband TPMI is sent in the first stage DCI, it may be that the base station does not send second stage DCI in the case that the wideband TPMI (having already been sent in the first stage DCI) is to be used to precode the scheduled PUSCH. Accordingly, the first stage DCI may not indicate the existence of a second stage DCI in such cases. The UE may correspondingly not attempt to decode a second stage DCI in such circumstances.

In the case where a first stage DCI indicates the existence of second stage DCI, but the UE fails to decode the second stage DCI, the UE may in some cases use the wideband precoder found in the first stage DCI to precode the scheduled PUSCH and then send the scheduled PUSCH. Alternatively, the UE may in other such cases not send the scheduled PUSCH at all. Whether to so use the wideband precoder or to drop the transmission of the PUSCH altogether in such cases may be predefined at the UE, and/or configured at the UE by higher layer signaling.

In some embodiments, the two-stage DCI may be sent in linked SSs. In such cases, the first stage DCI may be transmitted in a PDCCH of a first SS of the linked SSs, and the second stage DCI may be transmitted in a PDCCH of a second SS of the linked SSs. The first SSs (having the first stage DCI) may be considered the primary SS, and the second SS (having the second stage DCI) may be considered the secondary SS. Linkages and types (e.g., primary, secondary) for each such SS may be configured to the UE by RRC signaling or by a MAC CE.

FIG. 5 illustrates a diagram 500 showing a use of subband TPMIs when a two-stage DCI is sent across linked search spaces, according to an embodiment. A first PDCCH 502 of a first SS is sent by the base station to the UE. The first PDCCH 502 may include first stage DCI having a scheduling information for the PUSCH 506. This scheduling information may include a scheduling bandwidth for the PUSCH 506. The UE may then compare the scheduling bandwidth to a threshold. The threshold may be predefined, or may be configured by higher layer signaling (e.g., RRC signaling or a MAC CE).

In cases (not illustrated) where the UE determines that the scheduling bandwidth is below a threshold, the UE determines that the second stage DCI does not exist, and the UE proceeds to precode the PUSCH using a wideband precoder identified by the wideband TPMI from the first PDCCH. This may reflect a recognition that for relatively smaller bandwidths, the sending of the PUSCH is bounded by a frequency range that is already relatively narrow, and that the wideband TPMI found in the first stage DCI accordingly provides a precoder that is sufficiently particularized as to this (relatively narrow) bandwidth.

In other cases (like as illustrated in FIG. 5), when the UE determines that the scheduling bandwidth is equal to or greater than a threshold, the UE determines that the second stage DCI exists and that it should use subband precoders indicated by subband TPMIs in the second stage DCI. Accordingly, the UE proceeds to locate and decode the second stage DCI found on the second PDCCH 504 of the second SS that is linked to the first SS of the first PDCCH 502. This second stage DCI may include the subband TPMIs. The UE then proceeds to precode the PUSCH using the subband precoders identified by the subband TPMIs and sends the PUSCH.

A time offset (larger than a threshold) may be used between the first stage DCI and the second stage DCI so that the UE has sufficient time to decode the first PDCCH 502 having the first stage DCI in the first SS (to learn the existence of the second stage DCI) and prepare to decode the second PDCCH 504 having the second stage DCI in the second SS.

When the UE determines to use a wideband precoder of the wideband TPMI as described above, it may be that the UE does not include the secondary SS for blind detection (BD)/CCE counting. Alternatively, it may be that the UE always assumes that two-stage DCI is transmitted, and thus the secondary SS is included for BD/CCE counting purposes (even in cases were the second stage DCI in the secondary SS is not actually used).

It may be that if the primary SS is dropped (e.g., due to overbooking, or a quasi-colocation (QCL)-typeD collision, etc.), the secondary SS should also be dropped.

When using two-stage DCI across linked search spaces, a scheduling offset between the second PDCCH 504 and the PUSCH 506 may be used to ensure that there is sufficient time for the UE to decode the second PDCCH 504 and accordingly prepare to send the PUSCH 506 as described. This scheduling offset may be determined from the last symbol of the second PDCCH 504 in the secondary SS.

In some embodiments, the two-stage DCI may be sent in a single SS, but across multiple CCE sets of that single SS. An SS may include primary CCE sets (PCCE) and secondary CCE sets (SCCE). In such cases, the first stage DCI may be transmitted in a first PDCCH of a PCCE of the SS, and the second stage DCI may be transmitted in a second PDCCH of a SCCE of the SS. The PCCE and the SCCE may be 1:1 mapped, and any linkage between a PCCE and its corresponding PCCE may be configured by higher layer signaling or determined according to a CCE set index.

FIG. 6 illustrates a diagram 600 showing a use of subband TPMIs when a two-stage DCI is sent across multiple CCE sets of an SS, according to an embodiment. A first PDCCH 602 of a PCCE is sent by the base station to the UE. The first PDCCH 602 may include first stage DCI having scheduling information for the PUSCH 606. This scheduling information may include a scheduling bandwidth for the PUSCH 606. The UE may then compare the scheduling bandwidth to a threshold. The threshold may be predefined, or may be configured by higher layer signaling (e.g., RRC signaling or a MAC CE).

In cases (not illustrated) where the UE determines that the scheduling bandwidth is below a threshold, the UE determines that the second stage DCI does not exist, and the UE proceeds to precode the PUSCH using a wideband precoder identified by the wideband TPMI from the first PDCCH. This may reflect a recognition that for relatively smaller bandwidths, the sending of the PUSCH is bounded by a frequency range that is already relatively narrow, and that the wideband TPMI found in the first stage DCI accordingly provides a precoder that is sufficiently particularized as to this (relatively narrow) bandwidth.

In other cases (like as illustrated in FIG. 6), when the UE determines that the scheduling bandwidth is equal to or greater than a threshold, the UE determines that the second stage DCI exists and that it should use subband precoders indicated by subband TPMIs in the second stage DCI. Accordingly, the UE proceeds to locate and decode the second stage DCI found on the second PDCCH 604 of the SCCE that is linked to the PCCE having the first PDCCH 602. This second stage DCI may include the subband TPMIs. The UE then proceeds to precode the PUSCH using the subband precoders identified by the subband TPMIs and sends the PUSCH.

When using two-stage DCI across multiple CCE sets of a SS, a scheduling offset between the second PDCCH 604 and the PUSCH 606 may be used to ensure that there is sufficient time for the UE to decode the second PDCCH 604 and accordingly prepare to send the PUSCH 606 as described. This scheduling offset may be determined from the last symbol of the second PDCCH 604 in the PCCE.

Figure 7:
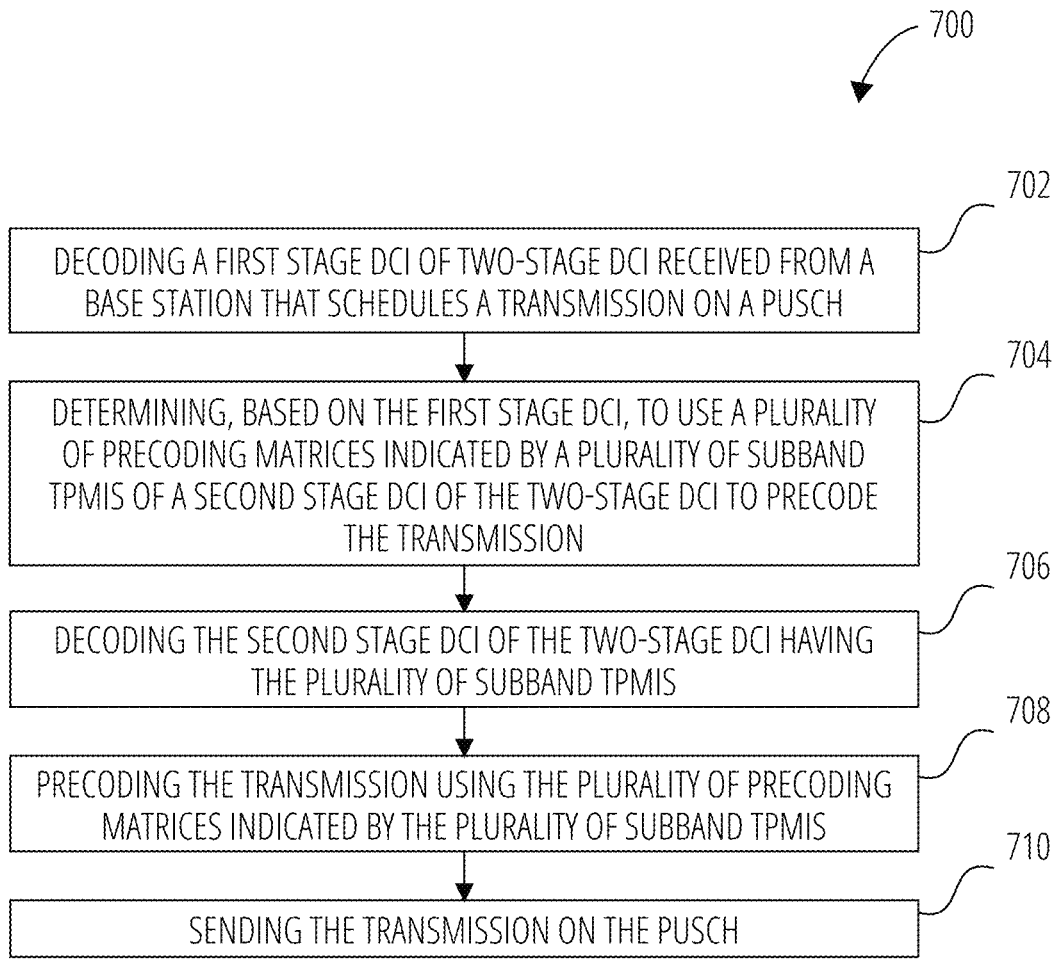
FIG. 7 illustrated a method of a UE, according to an embodiment.

FIG. 7 illustrated a method 700 of a UE, according to an embodiment. The method 700 includes decoding 702 a first stage DCI of two-stage DCI received from a base station that schedules a transmission on a PUSCH.

The method 700 further includes determining 704, based on the first stage DCI, to use a plurality of precoding matrices indicated by a plurality of subband TPMIs of a second stage DCI of the two-stage DCI to precode the transmission.

The method 700 further includes decoding 706 the second stage DCI of the two-stage DCI having the plurality of subband TPMIs.

The method 700 further includes precoding 708 the transmission using the plurality of precoding matrices indicated by the plurality of subband TPMIs.

The method 700 further includes sending 710 the transmission on the PUSCH.

In some embodiments of the method 700, the determining, based on the first stage DCI, to use the plurality of precoding matrices indicated by the plurality of subband TPMIs is based on a field of the first stage DCI. In some of these embodiments, the field of the first stage DCI is a one-bit indicator.

In some embodiments of the method 700, the determining, based on the first stage DCI, to use the plurality of precoding matrices indicated by the plurality of subband TPMIs is based on a reserved value for a field of the first stage DCI. In some of these embodiments, the reserved value comprises a value of a DMRS antenna port indication of the first stage DCI.

In some embodiments of the method 700, the determining, based on the first stage DCI, to use the plurality of precoding matrices indicated by the plurality of subband TPMIs is based on a determination about a starting CCE index for a PDCCH carrying the first stage DCI. In some of these embodiments, the determination about the starting CCE index is that the starting CCE index is odd.

In some embodiments of the method 700, the determining, based on the first stage DCI, to use the plurality of precoding matrices indicated by the plurality of subband TPMIs is based on a RNTI associated with a PDCCH carrying the first stage DCI.

In some embodiments of the method 700, when the first stage DCI is sent in a first SS and the second stage DCI is sent in a second SS, the determining, based on the first stage DCI, to use the plurality of precoding matrices indicated by the plurality of subband TPMIs is based on a comparison of a scheduling bandwidth indicated by the first stage DCI to a threshold.

In some embodiments of the method 700, when the first stage DCI is sent in a PCCE of an SS and the second stage DCI is sent in an SCCE of the SS, the determining, based on the first stage DCI, to use the plurality of precoding matrices indicated by the plurality of subband TPMIs is based on a comparison of a scheduling bandwidth indicated by the first stage DCI to a threshold.

In some embodiments of the method 700, the UE is capable of performing coherent transmission, and wherein the plurality of precoding matrices indicated by the plurality of subband TPMIs includes a coherent precoding matrix.

In some embodiments of the method 700, the UE is capable of performing partial-coherent transmission, and wherein the plurality of precoding matrices indicated by the plurality of subband TPMIs includes a partial-coherent precoding matrix.

In some embodiments of the method 700, the first stage DCI comprises a wideband TPMI.

In some embodiments of the method 700, the transmission is sent on a plurality of subbands corresponding to the plurality of subband TPMIs.

Embodiments contemplated herein include an apparatus comprising means to perform one or more elements of the method 700. This apparatus may be, for example, an apparatus of a UE (such as a wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a UE (such as a memory 1606 of a wireless device 1602 that is a UE, as described herein).

Embodiments contemplated herein include an apparatus comprising logic, modules, or circuitry to perform one or more elements of the method 700. This apparatus may be, for example, an apparatus of a UE (such as a wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a UE (such as a wireless device 1602 that is a UE, as described herein).

Embodiments contemplated herein include a signal as described in or related to one or more elements of the method 700.

Embodiments contemplated herein include a computer program or computer program product comprising instructions, wherein execution of the program by a processor is to cause the processor to carry out one or more elements of the method 700. The processor may be a processor of a UE (such as a processor(s) 1604 of a wireless device 1602 that is a UE, as described herein). These instructions may be, for example, located in the processor and/or on a memory of the UE (such as a memory 1606 of a wireless device 1602 that is a UE, as described herein).

Figure 8:
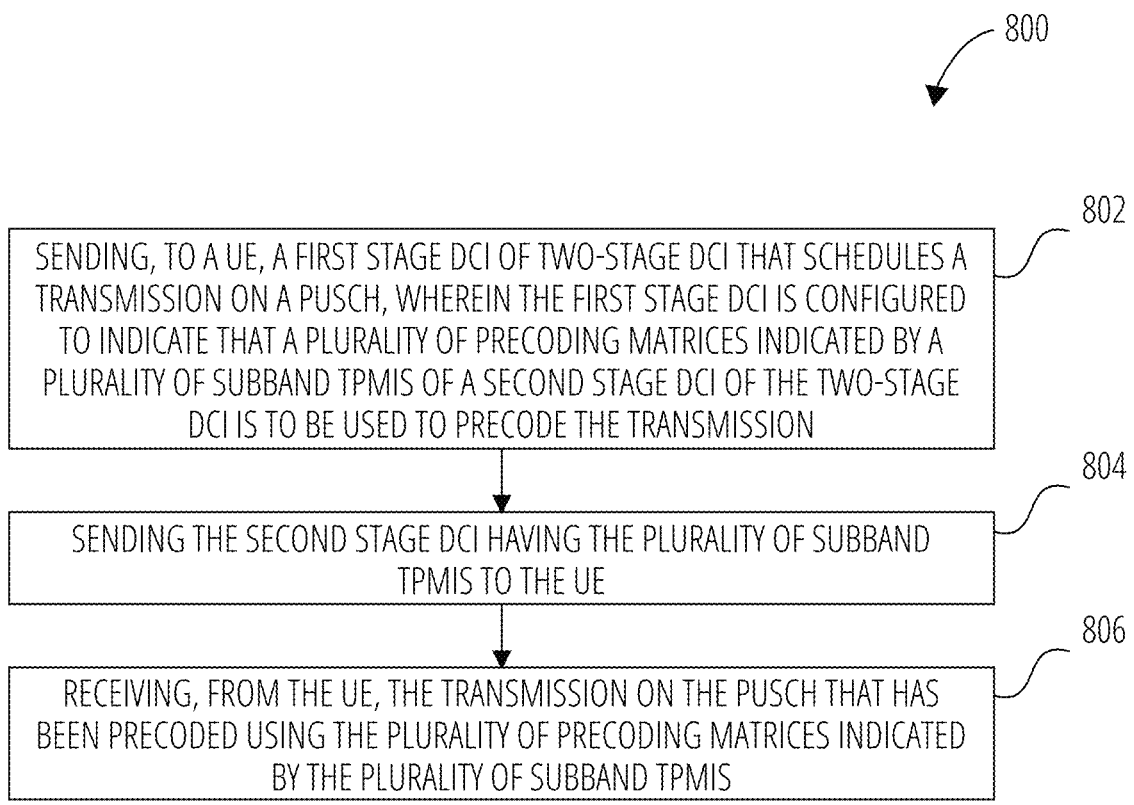
FIG. 8 illustrates a method of a base station, according to an embodiment.

FIG. 8 illustrates a method 800 of a base station, according to an embodiment. The method 800 includes sending 802, to a UE, a first stage DCI of two-stage DCI that schedules a transmission on a PUSCH, wherein the first stage DCI is configured to indicate that a plurality of precoding matrices indicated by a plurality of subband TPMIs of a second stage DCI of the two-stage DCI is to be used to precode the transmission.

The method 800 further includes sending 804 the second stage DCI having the plurality of subband TPMIs to the UE.

The method 800 further includes receiving 806, from the UE, the transmission on the PUSCH that has been precoded using the plurality of precoding matrices indicated by the plurality of subband TPMIs.

In some embodiments of the method 800, the first stage DCI is configured to indicate that the plurality of precoding matrices indicated by the plurality of subband TPMIs are to be used via a field of the first stage DCI. In some of these embodiments, the field of the first stage DCI is a one-bit indicator.

In some embodiments of the method 800, the first stage DCI is configured to indicate that the plurality of precoding matrices indicated by the plurality of subband TPMIs are to be used via a reserved value for a field of the first stage DCI. In some of these embodiments, the reserved value comprises a value of a DMRS antenna port indication of the first stage DCI.

In some embodiments of the method 800, the first stage DCI is configured to indicate that the plurality of precoding matrices indicated by the plurality of subband TPMIs are to be used by being sent in a PDCCH having a starting CCE index corresponding to the use of the plurality of subband TPMIs. In some of these embodiments, the starting CCE index corresponds to the use of the plurality of subband TPMIs because the starting CCE index is odd.

In some embodiments of the method 800, the first stage DCI is configured to indicate that the plurality of precoding matrices indicated by the plurality of subband TPMIs are to be used by being sent in a PDCCH associated with an RNTI corresponding to the use of the plurality of subband TPMIs.

In some embodiments of the method 800, when the first stage DCI is sent in a first SS and the second stage DCI is sent in a second SS, the first stage DCI is configured to indicate that the plurality of precoding matrices indicated by the plurality of subband TPMIs are to be used via a scheduling bandwidth indicated by the first stage DCI.

In some embodiments of the method 800, when the first stage DCI is sent in a PCCE of a search space (SS) and the second stage DCI is sent in an SCCE of the SS, the first stage DCI is configured to indicate that the plurality of precoding matrices indicated by the plurality of subband TPMIs are to be used via a scheduling bandwidth indicated by the first stage DCI.

In some embodiments of the method 800, the UE is capable of performing coherent transmission, and wherein the plurality of precoding matrices indicated by the plurality of subband TPMIs includes a coherent precoding matrix.

In some embodiments of the method 800, the UE is capable of performing partial-coherent transmission, and wherein the plurality of precoding matrices indicated by the plurality of subband TPMIs includes a partial-coherent precoding matrix.

In some embodiments of the method 800, the first stage DCI comprises a wideband TPMI.

In some embodiments of the method 800, the transmission is received on a plurality of subbands corresponding to the plurality of subband TPMIs.

Embodiments contemplated herein include an apparatus comprising means to perform one or more elements of the method 800. This apparatus may be, for example, an apparatus of a base station (such as a network device 1618 that is a base station, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a base station (such as a memory 1622 of a network device 1618 that is a base station, as described herein).

Embodiments contemplated herein include an apparatus comprising logic, modules, or circuitry to perform one or more elements of the method 800. This apparatus may be, for example, an apparatus of a base station (such as a network device 1618 that is a base station, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a base station (such as a network device 1618 that is a base station, as described herein).

Embodiments contemplated herein include a signal as described in or related to one or more elements of the method 800.

Embodiments contemplated herein include a computer program or computer program product comprising instructions, wherein execution of the program by a processing element is to cause the processing element to carry out one or more elements of the method 800. The processor may be a processor of a base station (such as a processor(s) 1620 of a network device 1618 that is a base station, as described herein). These instructions may be, for example, located in the processor and/or on a memory of the base station (such as a memory 1622 of a network device 1618 that is a base station, as described herein).

In some embodiments, the nature of the wideband TPMI/subband TPMI operation can be determined relative to a scheduling bandwidth provided by the base station. For example, suppose that X resource blocks (RBs) are scheduled by the base station, and that N subband TPMI(s) are indicated by the base station as well.

In a first case, it may be that a threshold T (representing a threshold for a number of RBs) is used at the UE. T may be predefined at the UE, or may be configured to the UE by higher layer signaling. Then, if X>T, the indicated subband TMPIs are used at the UE to identify precoders to use to precode (portions of) transmissions within the scheduled RBs (according to corresponding subbands). In this case, the UE iterates through each subband TPMI n of the N subband TPMI(s) with respect to the X RBs, where the $n^{th}$ subband TPMI is applied for every ceil(X/N) or floor(X/N) of the X RBs (with the last subband TPMI applied for all remaining unapplied-to RBs at that last iteration, in the case of unequal division in X/N).

Otherwise, if X≤T, a wideband TPMI is used to identify a wideband precoder used for all transmissions within the corresponding frequency range.

Figure 9:
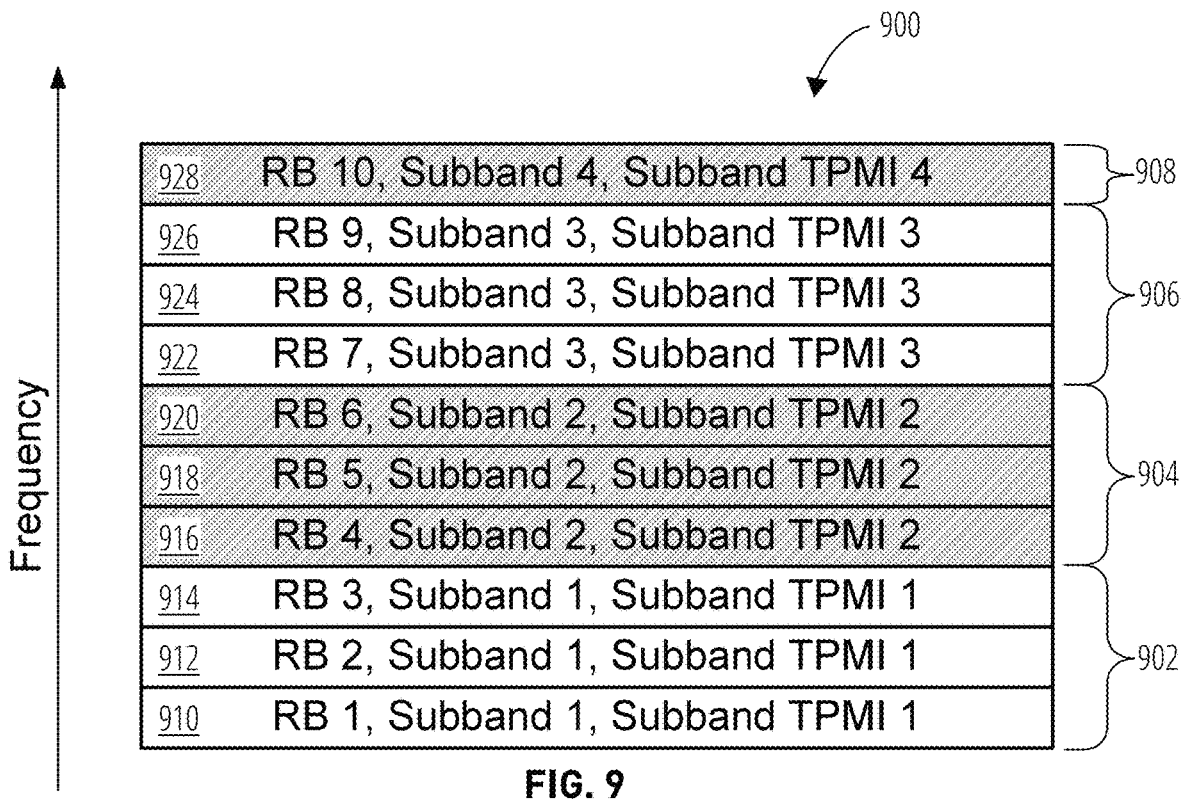
FIG. 9 shows a diagram showing an assignment of subband TPMIs to various RBs, according to an embodiment.

FIG. 9 shows a diagram 900 showing an assignment of subband TPMIs to various RBs, according to an embodiment. In the embodiment shown in FIGS. 9, X=10 and N=4. The UE first determines that X>T (e.g., that the 10 RBs scheduled exceed the threshold for RBs for using subband TPMIs that is known to the UE). The UE then iterates through each of the 4 subband TPMIs with respect to the 10 RBs, assigning one of them during each iteration to ceil(10/4)=3 of the scheduled RBs (as possible). Accordingly, as illustrated, the UE assigns a first subband TPMI to a first subband 902 having the first RB 910, the second RB 912, and the third RB 914; assigns a second subband TPMI to a second subband 904 made up of the fourth RB 916, the fifth RB 918, and the sixth RB 920; assigns a third subband TPMI to a third RB subband 906 made up of the seventh RB 922, the eighth RB 924, and the ninth RB 926; and assigns a fourth subband TPMI to a fourth subband 908 made up of the tenth RB 928 (and note that there are no more RBs available for assignment, so this fourth subband 908 has fewer than three RBs).

In a second case, it may be that a subband size (in RB) K is configured to the UE by higher layer signaling. Then, the UE iterates through each subband TPMI n of the N subband TPMI(s) with respect to the X RBs, where the $n^{th}$ subband TPMI is applied for every K of the X RBs. In the case that X>N*K, there will remain unassigned (leftover) RBs once all of the N subband TPMIs have been assigned out in this fashion. In this case, a wideband TPMI may be assigned to the remaining RBs. In the case that X<N*K, it may be that one or more subband TPMIs are not fully used on K RB. Further, it may also be that only the subband TPMI(s)

corresponding to scheduled RBs according to the assignment method described will actually be assigned to those corresponding RBs (e.g., it may be that one or more subband TPMIs are not actually assigned to one or more RBs).

Figure 10:
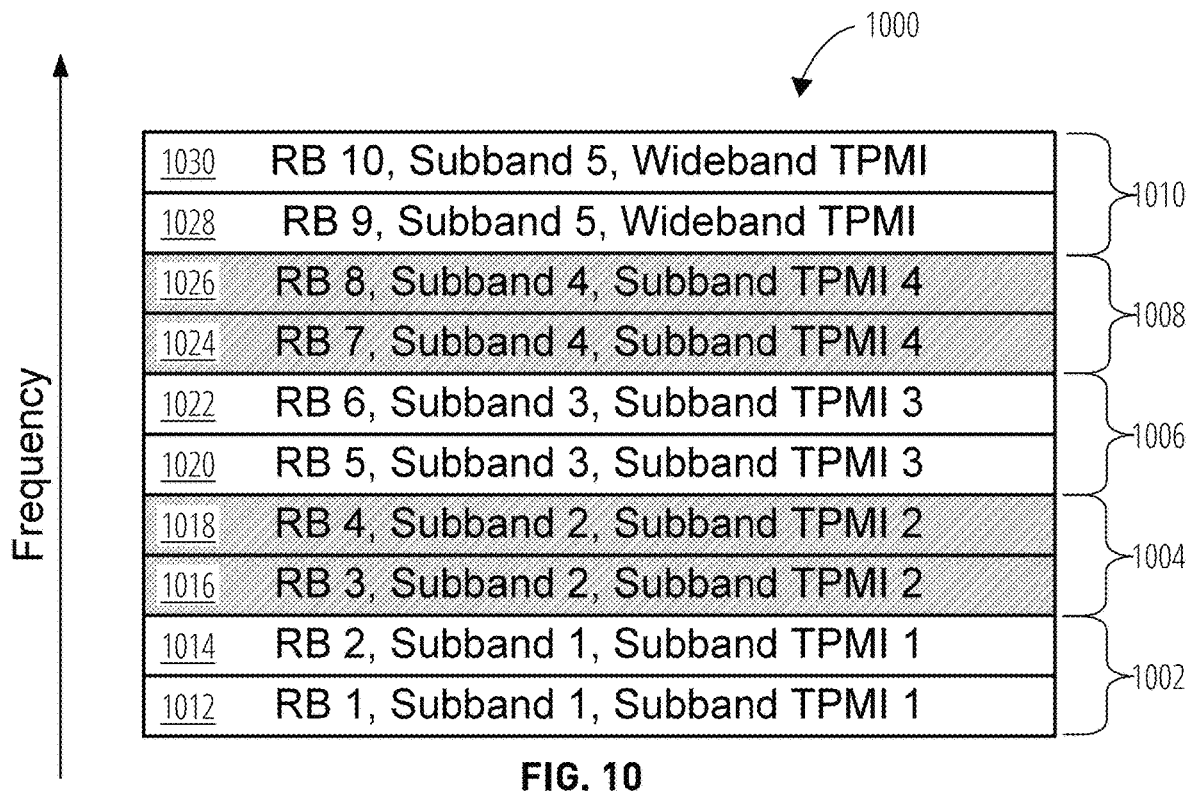
FIG. 10 shows a diagram showing an assignment of subband TPMIs to various RBs, according to an embodiment.

FIG. 10 shows a diagram 1000 showing an assignment of subband TPMIs to various RBs, according to an embodiment. In the embodiment shown in FIG. 10, X=10, N=4, and K=2. The UE iterates through each of the 4 subband TPMIs with respect to the 10 RBs, assigning one of them during each iteration to K=2 of the scheduled RBs. Accordingly, as illustrated, the UE assigns a first subband TPMI to a first subband 1002 having the first RB 1012 and the second RB 1014; assigns a second subband TPMI to a second subband 1004 made up of the third RB 1016 and the fourth RB 1018; assigns a third subband TPMI to a third RB subband 1006 made up of the fifth RB 1020 and the sixth RB 1022; and assigns a fourth subband TPMI to a fourth subband 1008 made up of the seventh RB 1024 and the eighth RB 1026.

Because in this case X>N*K, there remain leftover RBs (the ninth RB 1028 and the tenth RB 1030) once the iterations through the N TPMI complete with the assignment of the fourth subband TPMI to the fourth subband 1008. Accordingly, a wideband TPMI is assigned to the fifth subband 1010 having the remaining ninth RB 1028 and the tenth RB 1030.

Figure 11:
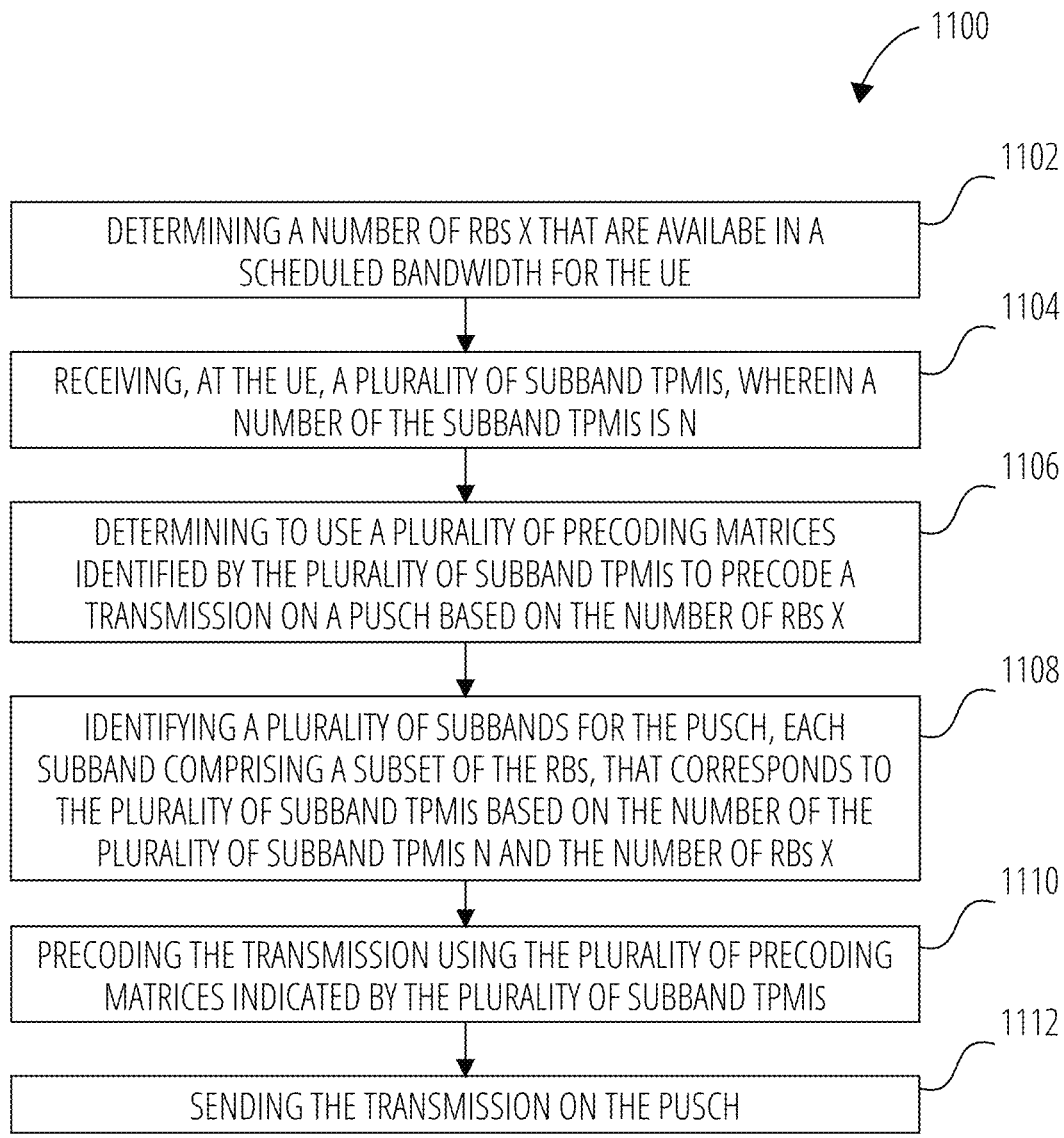
FIG. 11 illustrates a method of a UE, according to an embodiment.

FIG. 11 illustrates a method 1100 of a UE, according to an embodiment. The method 1100 includes determining 1102 a number of RBs X that are available in a scheduled bandwidth for the UE.

The method 1100 further includes receiving 1104, at the UE, a plurality of subband TPMIs, wherein a number of the subband TPMIs is N.

The method 1100 further includes determining 1106 to use a plurality of precoding matrices identified by the plurality of subband TPMIs to precode a transmission on a PUSCH based on the number of RBs X.

The method 1100 further includes identifying 1108 a plurality of subbands for the PUSCH, each comprising a subset of the RBs, that correspond to the plurality of subband TPMIs based on the number of the plurality of subband TMPIs N and the number of RBs X.

The method 1100 further includes precoding 1110 the transmission using the plurality of precoding matrices indicated by the plurality of subband TPMIs.

The method 1100 further includes sending 1112 the transmission on the PUSCH.

In some embodiments of the method 1100, the determining to use the precoding matrix identified the plurality of subband TMPIs is performed when the number of RBs X is greater than a threshold. In some of these embodiments, a subset of the RBs of at least one of the plurality of subbands equals one of ceil(X/N) RBs and floor(X/N) RBs.

In some embodiments, the method 1100 further includes receiving a subband size K RBs, wherein a subset of the RBs of at least one of the plurality of subbands equals K RBs.

Embodiments contemplated herein include an apparatus comprising means to perform one or more elements of the method 1100. This apparatus may be, for example, an apparatus of a UE (such as a wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 1100. This non-transitory computer-readable media may be, for example, a memory of a UE (such as a memory 1606 of a wireless device 1602 that is a UE, as described herein).

Embodiments contemplated herein include an apparatus comprising logic, modules, or circuitry to perform one or more elements of the method 1100. This apparatus may be, for example, an apparatus of a UE (such as a wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 1100. This apparatus may be, for example, an apparatus of a UE (such as a wireless device 1602 that is a UE, as described herein).

Embodiments contemplated herein include a signal as described in or related to one or more elements of the method 1100.

Embodiments contemplated herein include a computer program or computer program product comprising instructions, wherein execution of the program by a processor is to cause the processor to carry out one or more elements of the method 1100. The processor may be a processor of a UE (such as a processor(s) 1604 of a wireless device 1602 that is a UE, as described herein). These instructions may be, for example, located in the processor and/or on a memory of the UE (such as a memory 1606 of a wireless device 1602 that is a UE, as described herein).

In some embodiments, it may be that the use of subband precoders and/or subband TPMI indications may depend on a UE capability as to non-coherent transmission, partial-coherent transmission, and/or coherent transmission.

For example, it may be, in a first case, that subband TPMIs indicated by the base station may correspond to a codebook subset having coherent precoders. Accordingly, it may be that the indication of subband TPMIs to the UE occurs only if a UE is capable of coherent transmission. It may be that the base station can indicate a candidate value for representing the codebook subset, such that the UE can identify a candidate value the codebook subset being used (e.g., so that the UE can use the same codebook subset as the base station with the provided TPMI(s) to identify the intended coherent precoders).

In some such cases, it may be that the UE is also capable of partial-coherent transmission, and some TPMIs for partial-coherent precoders using more than a threshold X antenna ports may also be used in the codebook subset from which the subband TPMIs are drawn (where, for example, X=2 or X=4, and may be predefined according to performance testing data). This lower bound on X may help to ensure that the precoders used correspond to beams of sufficient narrowness (to ensure sufficient performance gain to offset the computational cost of using such a precoder).

For UE that cannot support coherent transmission (e.g., can only support non-coherent and/or partial-coherent transmission), it may be that the base station indicates a wideband TPMI for use for UL (e.g., PUSCH) transmission.

In a second case, it may be that subband TPMIs indicated by the base station may correspond to a codebook subset that includes coherent precoders and partial-coherent precoders. Accordingly, it may be that the indication of subband TPMIs to the UE occurs only if a UE is capable of coherent transmission and/or partial-coherent transmission. It may be that the base station can indicate a candidate value for representing the codebook subset, such that the UE can identify the codebook subset being used (e.g., so that the UE can use the same codebook subset as the base station with the provided TPMIs to identify the intended coherent precoders and partial-coherent precoders).

The partial-coherent precoders included in the codebook subset may be precoders that have more than X number of non-zero-power (NZP) antenna ports for at least one layer of the precoder, or that have more than X number of non-zero-power (NZP) antenna ports for each layer of the precoder.

For UE that cannot support coherent or partial-coherent transmission (e.g., can only support non-coherent transmission), it may be that the base station indicates a wideband TPMI for use for UL transmission.

Figure 12:
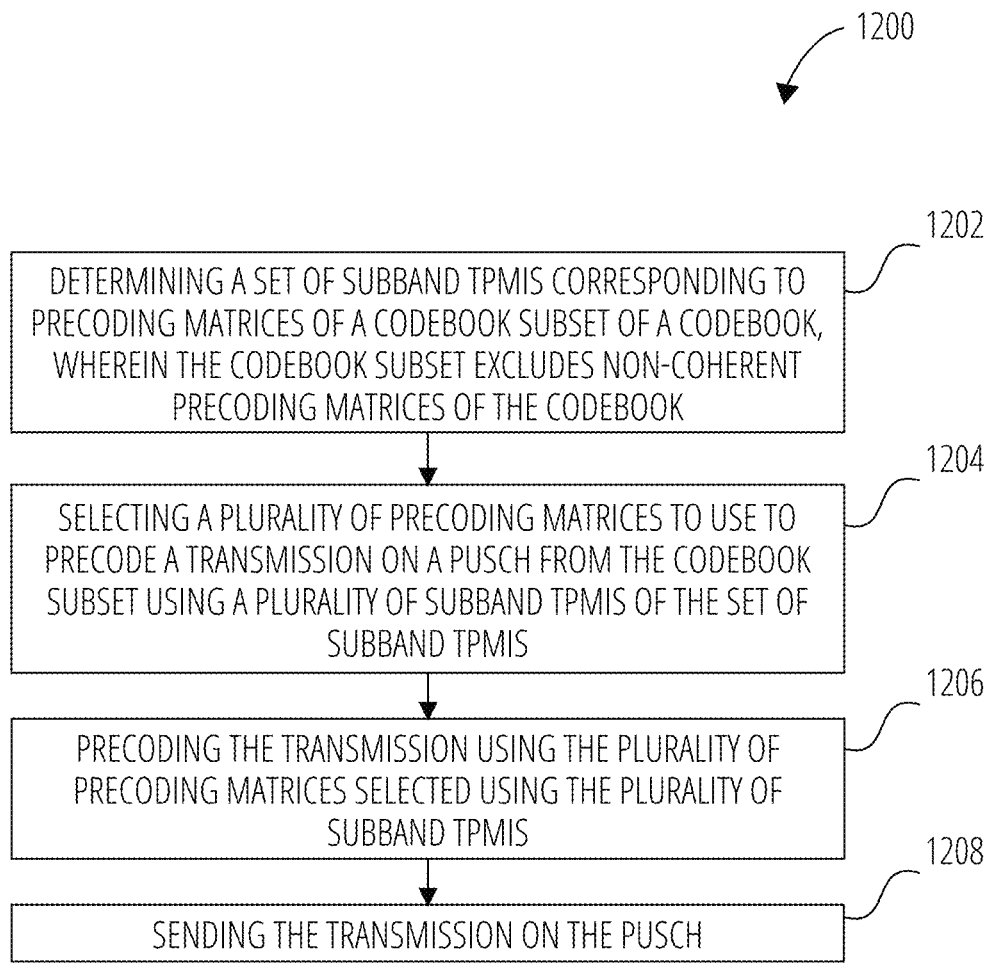
FIG. 12 illustrates a method of a UE, according to an embodiment.

FIG. 12 illustrates a method 1200 of a UE, according to an embodiment. The method 1200 includes determining 1202 a set of subband TPMIs corresponding to precoding matrices of a codebook subset of a codebook, wherein the codebook subset excludes non-coherent precoding matrices of the codebook.

The method 1200 further includes selecting 1204 a plurality of precoding matrices to use to precode a transmission on a PUSCH from the codebook subset using a plurality of subband TPMIs of the set of subband TPMIs.

The method 1200 further includes precoding 1206 the transmission using the plurality of precoding matrices selected using the plurality of subband TPMIs.

The method 1200 further includes sending 1208 the transmission on the PUSCH.

In some embodiments of the method 1200, the codebook subset includes only coherent precoding matrices.

In some embodiments of the method 1200, the codebook subset includes partial-coherent and coherent precoding matrices of the codebook. In some of these embodiments, each of the partial-coherent precoding matrices uses a number of antenna ports that is greater than a threshold. In some of these embodiments, each of the partial-coherent precoding matrices has more than a threshold amount of non-zero-power (NZP) antenna ports for at least one layer of the respective precoding matrix. In some of these embodiments, each of the partial-coherent precoding matrices has more than a threshold amount of non-zero-power (NZP) antenna ports for each layer of the respective precoding matrix.

In some embodiments, the method 1200 further includes receiving, from a base station, an indication informing the UE that the codebook subset comprises coherent precoders. In some of these embodiments, the indication further informs the UE that the codebook comprises partial-coherent precoders.

Embodiments contemplated herein include an apparatus comprising means to perform one or more elements of the method 1200. This apparatus may be, for example, an apparatus of a UE (such as a wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 1200. This non-transitory computer-readable media may be, for example, a memory of a UE (such as a memory 1606 of a wireless device 1602 that is a UE, as described herein).

Embodiments contemplated herein include an apparatus comprising logic, modules, or circuitry to perform one or more elements of the method 1200. This apparatus may be, for example, an apparatus of a UE (such as a wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 1200. This apparatus may be, for example, an apparatus of a UE (such as a wireless device 1602 that is a UE, as described herein).

Embodiments contemplated herein include a signal as described in or related to one or more elements of the method 1200.

Embodiments contemplated herein include a computer program or computer program product comprising instructions, wherein execution of the program by a processor is to cause the processor to carry out one or more elements of the method 1200. The processor may be a processor of a UE (such as a processor(s) 1604 of a wireless device 1602 that is a UE, as described herein). These instructions may be, for example, located in the processor and/or on a memory of the UE (such as a memory 1606 of a wireless device 1602 that is a UE, as described herein).

Figure 13:
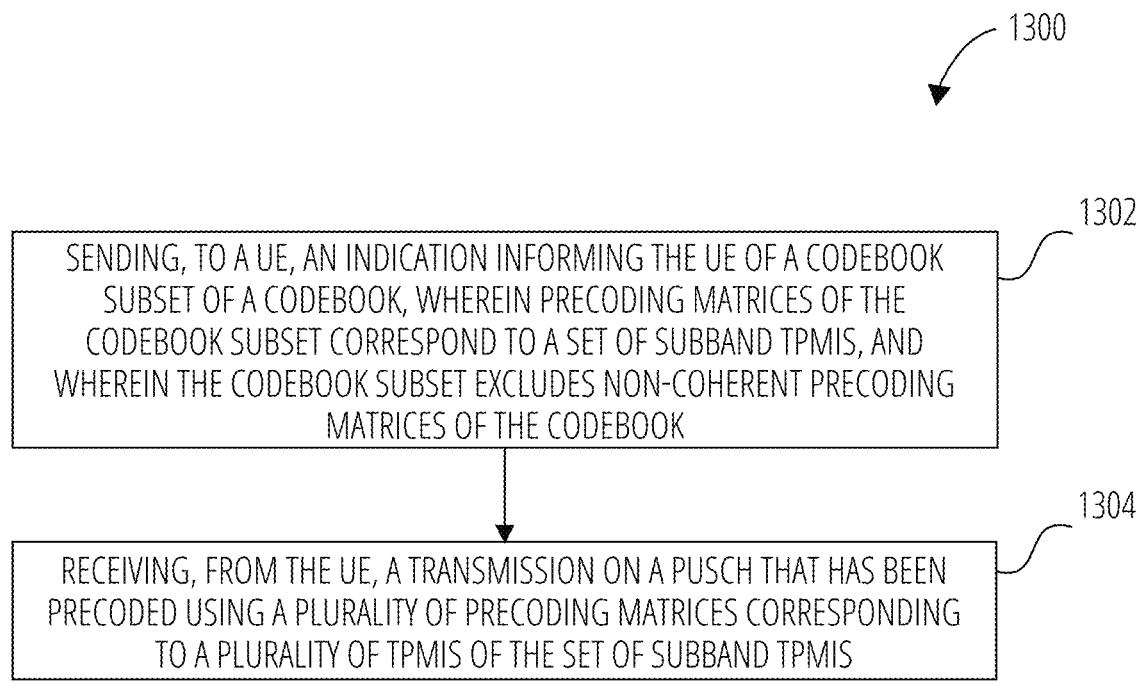
FIG. 13 illustrates a method of a base station, according to an embodiment.

FIG. 13 illustrates a method 1300 of a base station, according to an embodiment. The method 1300 includes sending 1302, to a UE, an indication informing the UE of a codebook subset of a codebook, wherein precoding matrices of the codebook subset correspond to a set of subband TPMIs, and wherein the codebook subset excludes non-coherent precoding matrices of the codebook.

The method 1300 further includes receiving 1304, from the UE, a transmission on a PUSCH that has been precoded using a plurality of precoding matrices corresponding to a plurality of TPMIs of the set of subband TPMIs.

In some embodiments of the method 1300, the codebook subset includes only coherent precoding matrices.

In some embodiments of the method 1300, the codebook subset includes partial-coherent and coherent precoding matrices of the codebook. In some of these embodiments, each of the partial-coherent precoding matrices uses a number of antenna ports that is greater than a threshold. In some of these embodiments, each of the partial-coherent precoding matrices has more than a threshold amount of non-zero-power (NZP) antenna ports for at least one layer of the respective precoding matrix. In some of these embodiments, each of the partial-coherent precoding matrices has more than a threshold amount of non-zero-power (NZP) antenna ports for each layer of the respective precoding matrix.

Embodiments contemplated herein include an apparatus comprising means to perform one or more elements of the method 1300. This apparatus may be, for example, an apparatus of a base station (such as a network device 1618 that is a base station, as described herein).

Embodiments contemplated herein include one or more non-transitory computer-readable media comprising instructions to cause an electronic device, upon execution of the instructions by one or more processors of the electronic device, to perform one or more elements of the method 1300. This non-transitory computer-readable media may be, for example, a memory of a base station (such as a memory 1622 of a network device 1618 that is a base station, as described herein).

Embodiments contemplated herein include an apparatus comprising logic, modules, or circuitry to perform one or more elements of the method 1300. This apparatus may be, for example, an apparatus of a base station (such as a network device 1618 that is a base station, as described herein).

Embodiments contemplated herein include an apparatus comprising: one or more processors and one or more computer-readable media comprising instructions that, when executed by the one or more processors, cause the one or more processors to perform one or more elements of the method 1300. This apparatus may be, for example, an apparatus of a base station (such as a network device 1618 that is a base station, as described herein).

Embodiments contemplated herein include a signal as described in or related to one or more elements of the method 1300.

Embodiments contemplated herein include a computer program or computer program product comprising instructions, wherein execution of the program by a processing element is to cause the processing element to carry out one or more elements of the method 1300. The processor may be a processor of a base station (such as a processor(s) 1620 of a network device 1618 that is a base station, as described herein). These instructions may be, for example, located in the processor and/or on a memory of the base station (such as a memory 1622 of a network device 1618 that is a base station, as described herein).

It is contemplated that in some cases, a UE may be involved in multi-TRP transmission. Accordingly, methods of frequency selective precoding in light of possible multi-TRP transmission are discussed.

In a first option, it may be that frequency selective precoding is only used when the UE performs single-TRP transmissions. In other words, it may be that frequency selective precoding is not used by a UE in the context of multi-TRP transmissions by the UE.

In a second option, it may be that frequency selective precoding is used for a UE that performs multi-TRP transmissions. In such cases, it may be that the use of a wideband TPMI, and/or the use of subband TPMIs (e.g., the use of RRC configuration information or DCI to indicate whether, for a PUSCH to be sent, a precoder corresponding to a wideband TPMI or precoders corresponding to subband TPMIs are to be used, as described herein) is configured on a per TRP basis, or across TRPs.

For example, in some such cases, DCI may indicate M*N subband TPMIs, where M is a number of TRPs in the multi-TRP transmission where subband TPMI-based operation (e.g., as described herein) is enabled, and N is a number of subband TPMIs per TRP. When two-stage DCI based operation is used, the second stage DCI may provide an indication for the subband TPMIs for multiple (e.g., both, all, etc.) TRPs being used.

Figure 14:
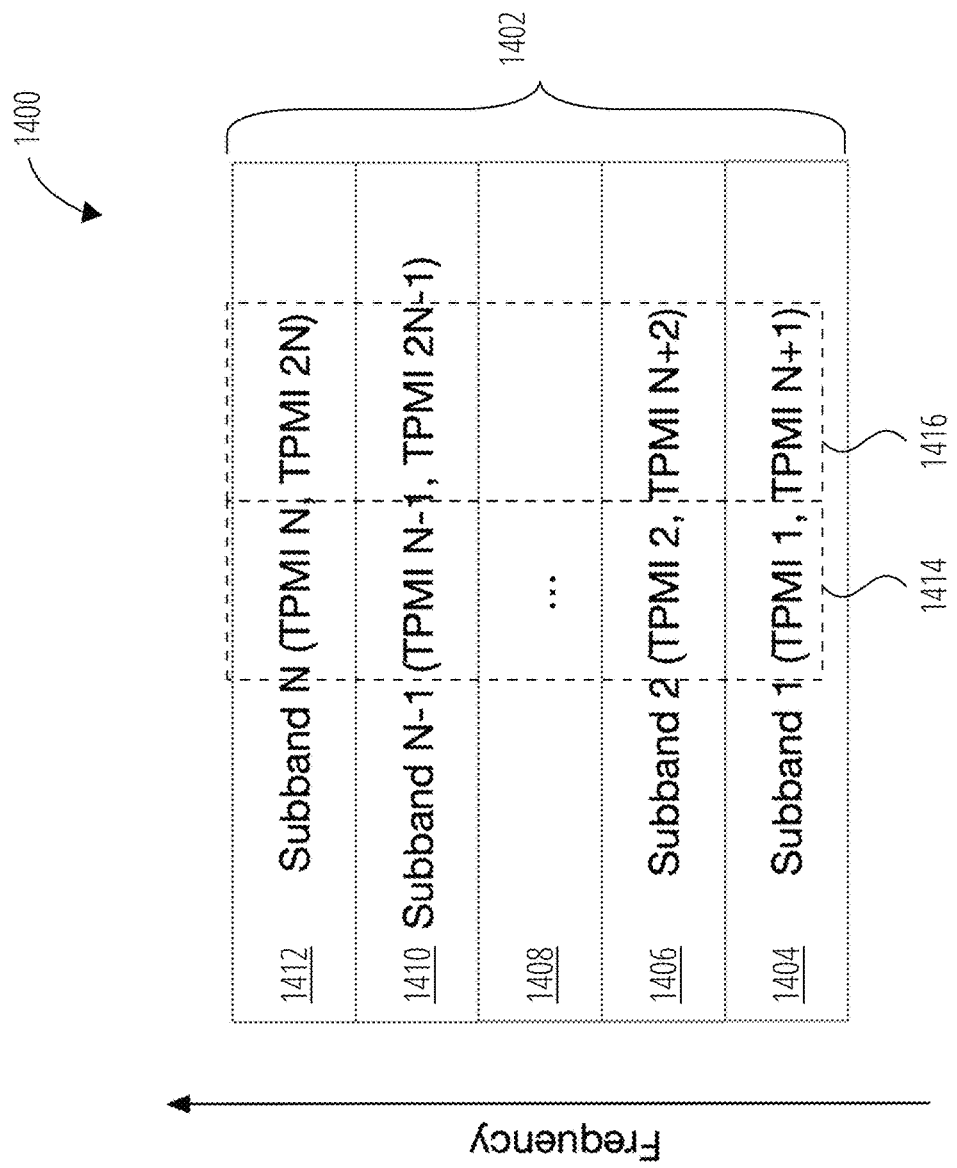
FIG. 14 illustrates a subband TPMI arrangement, according to an embodiment.

FIG. 14 illustrates a subband TPMI arrangement 1400, according to an embodiment. It may be that a bandwidth 1402 for an uplink (e.g., PUSCH) transmission is divided into a first subband 1404, a second subband 1406, additional subband(s) 1408, an N-1st subband 1410, and an Nth subband 1412.

A UE using the subband TPMI arrangement 1400 according to FIG. 14 may be configured to transmit to a pair of TRPs. It accordingly is contemplated that a base station may indicate per-TRP subband TPMIs for each of the first subband 1404, the second subband 1406, the additional subband(s) 1408, the N-1st subband 1410, and/or the Nth subband 1412. Accordingly, as illustrated, the base station may then configure the UE to use a first set of subband TPMIs 1414 to determine a first set of subband precoders for a PUSCH transmission to a first TRP, and/or may further configure the UE to use a second set of subband TPMIs 1416 to determine a second set of subband precoders for PUSCH transmissions to a second TRP.

Figure 15:
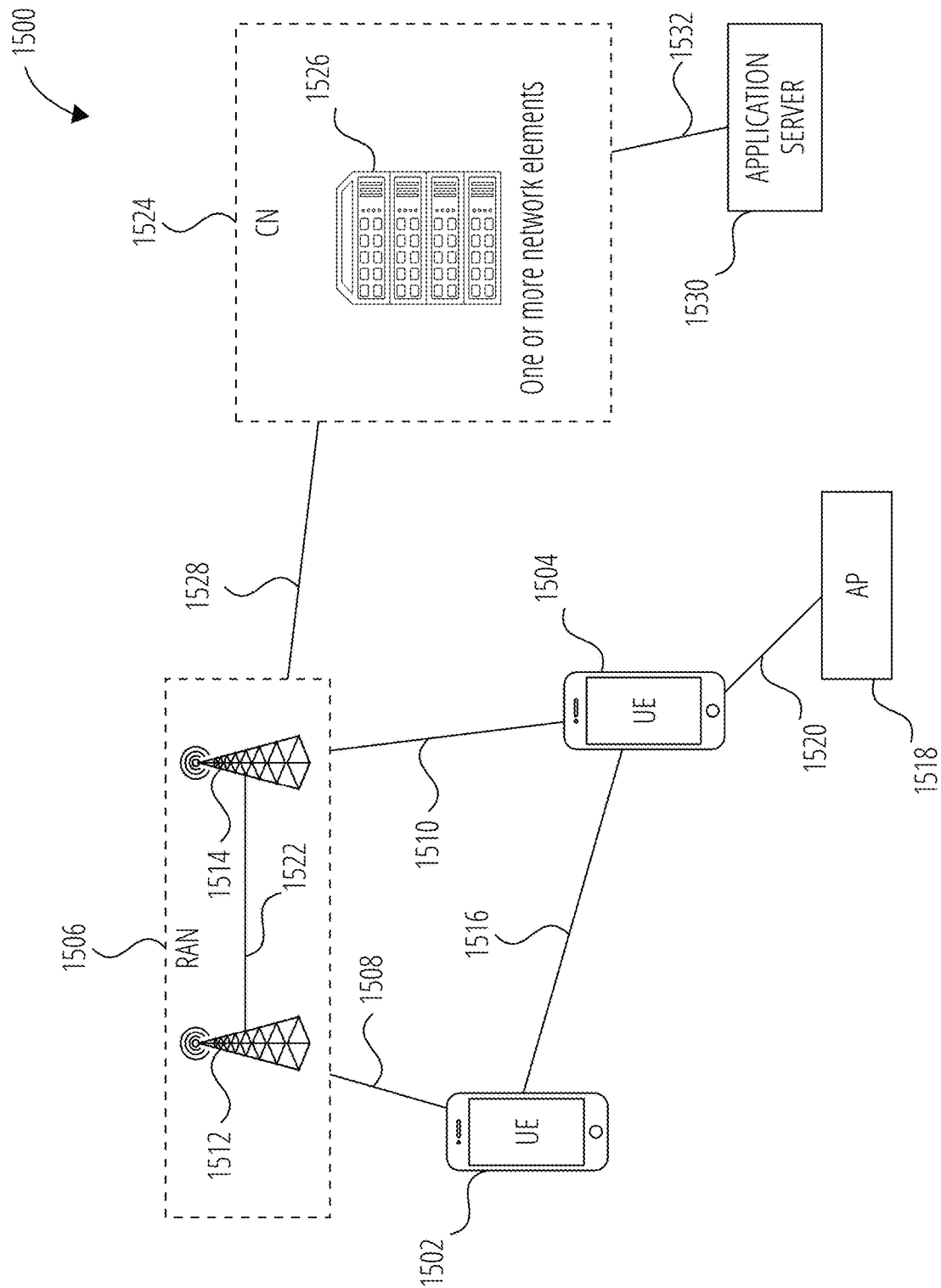
FIG. 15 illustrates an example architecture of a wireless communication system, according to embodiments disclosed herein.

FIG. 15 illustrates an example architecture of a wireless communication system 1500, according to embodiments disclosed herein. The following description is provided for an example wireless communication system 1500 that operates in conjunction with the LTE system standards and/or 5G or NR system standards as provided by 3GPP technical specifications.

As shown by FIG. 15, the wireless communication system 1500 includes UE 1502 and UE 1504 (although any number of UEs may be used). In this example, the UE 1502 and the UE 1504 are illustrated as smartphones (e.g., handheld touchscreen mobile computing devices connectable to one or more cellular networks), but may also comprise any mobile or non-mobile computing device configured for wireless communication.

The UE 1502 and UE 1504 may be configured to communicatively couple with a RAN 1506. In embodiments, the RAN 1506 may be NG-RAN, E-UTRAN, etc. The UE 1502 and UE 1504 utilize connections (or channels) (shown as connection 1508 and connection 1510, respectively) with the RAN 1506, each of which comprises a physical communications interface. The RAN 1506 can include one or more base stations, such as base station 1512 and base station 1514, that enable the connection 1508 and connection 1510.

In this example, the connection 1508 and connection 1510 are air interfaces to enable such communicative coupling, and may be consistent with RAT(s) used by the RAN 1506, such as, for example, an LTE and/or NR.

In some embodiments, the UE 1502 and UE 1504 may also directly exchange communication data via a sidelink interface 1516. The UE 1504 is shown to be configured to access an access point (shown as AP 1518) via connection 1520. By way of example, the connection 1520 can comprise a local wireless connection, such as a connection consistent with any IEEE 1002.11 protocol, wherein the AP 1518 may comprise a Wi-Fi® router. In this example, the AP 1518 may be connected to another network (for example, the Internet) without going through a CN 1524.

In embodiments, the UE 1502 and UE 1504 can be configured to communicate using orthogonal frequency division multiplexing (OFDM) communication signals with each other or with the base station 1512 and/or the base station 1514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1512 or base station 1514 may be implemented as one or more software entities running on server computers as part of a virtual network. In addition, or in other embodiments, the base station 1512 or base station 1514 may be configured to communicate with one another via interface 1522. In embodiments where the wireless communication system 1500 is an LTE system (e.g., when the CN 1524 is an EPC), the interface 1522 may be an X2 interface. The X2 interface may be defined between two or more base stations (e.g., two or more eNBs and the like) that connect to an EPC, and/or between two eNBs connecting to the EPC. In embodiments where the wireless communication system 1500 is an NR system (e.g., when CN 1524 is a 5GC), the interface 1522 may be an Xn interface. The Xn interface is defined between two or more base stations (e.g., two or more gNBs and the like) that connect to SGC, between a base station 1512 (e.g., a gNB) connecting to 5GC and an eNB, and/or between two eNBs connecting to 5GC (e.g., CN 1524).

The RAN 1506 is shown to be communicatively coupled to the CN 1524. The CN 1524 may comprise one or more network elements 1526, which are configured to offer various data and telecommunications services to customers/subscribers (e.g., users of UE 1502 and UE 1504) who are connected to the CN 1524 via the RAN 1506. The components of the CN 1524 may be implemented in one physical device or separate physical devices including components to read and execute instructions from a machine-readable or computer-readable medium (e.g., a non-transitory machine-readable storage medium).

In embodiments, the CN 1524 may be an EPC, and the RAN 1506 may be connected with the CN 1524 via an S1 interface 1528. In embodiments, the S1 interface 1528 may be split into two parts, an S1 user plane (S1-U) interface, which carries traffic data between the base station 1512 or base station 1514 and a serving gateway (S-GW), and the S1-MME interface, which is a signaling interface between the base station 1512 or base station 1514 and mobility management entities (MMEs).

In embodiments, the CN 1524 may be a 5GC, and the RAN 1506 may be connected with the CN 1524 via an NG interface 1528. In embodiments, the NG interface 1528 may be split into two parts, an NG user plane (NG-U) interface, which carries traffic data between the base station 1512 or base station 1514 and a user plane function (UPF), and the S1 control plane (NG-C) interface, which is a signaling interface between the base station 1512 or base station 1514 and access and mobility management functions (AMFs).

Generally, an application server 1530 may be an element offering applications that use internet protocol (IP) bearer resources with the CN 1524 (e.g., packet switched data services). The application server 1530 can also be configured to support one or more communication services (e.g., VoIP sessions, group communication sessions, etc.) for the UE 1502 and UE 1504 via the CN 1524. The application server 1530 may communicate with the CN 1524 through an IP communications interface 1532.

Figure 16:
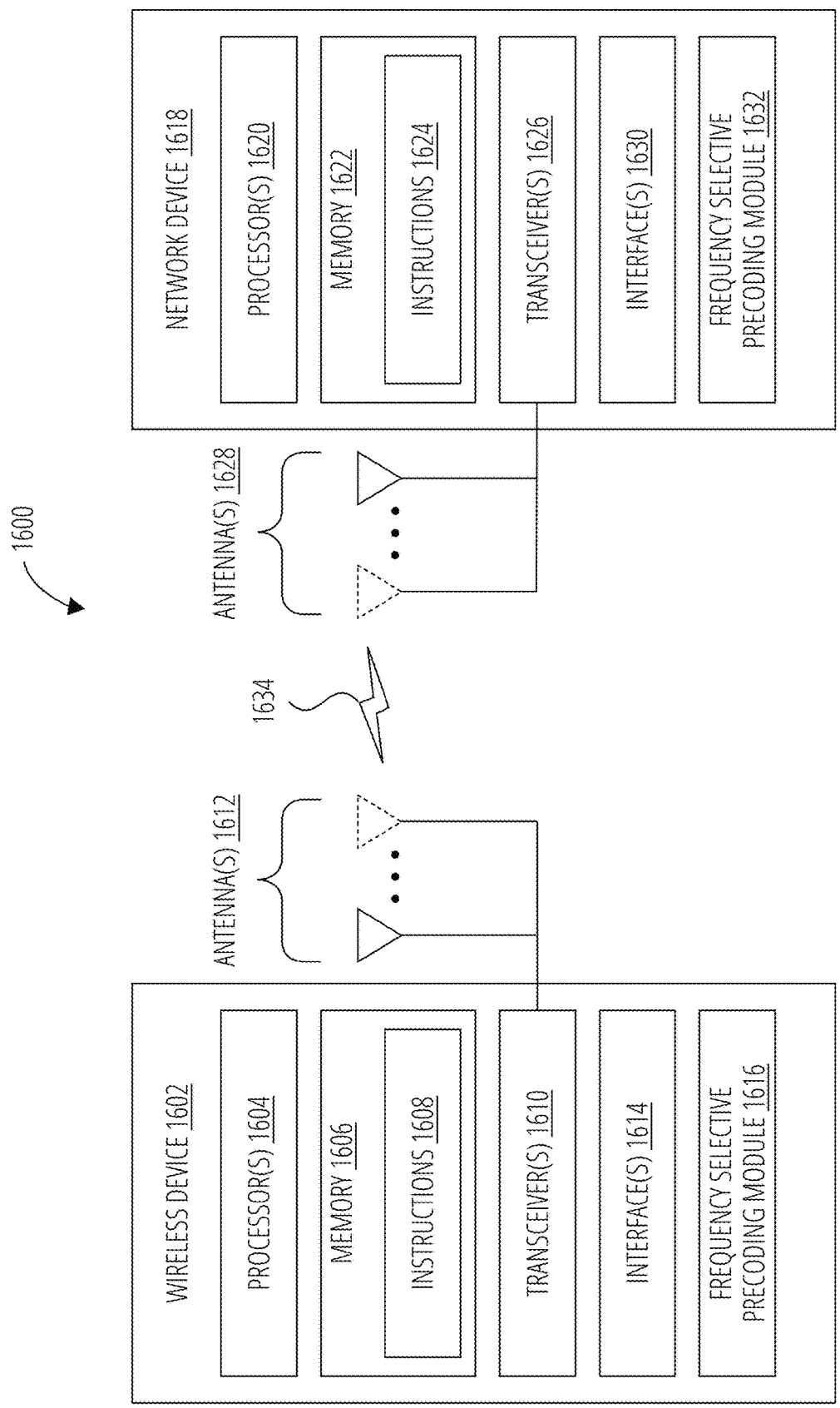
FIG. 16 illustrates a system for performing signaling between a wireless device and a network device, according to embodiments disclosed herein.

FIG. 16 illustrates a system 1600 for performing signaling 1634 between a wireless device 1602 and a network device 1618, according to embodiments disclosed herein. The system 1600 may be a portion of a wireless communications system as herein described. The wireless device 1602 may be, for example, a UE of a wireless communication system. The network device 1618 may be, for example, a base station (e.g., an eNB or a gNB) of a wireless communication system.

The wireless device 1602 may include one or more processor(s) 1604. The processor(s) 1604 may execute instructions such that various operations of the wireless device 1602 are performed, as described herein. The processor(s) 1604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1602 may include a memory 1606. The memory 1606 may be a non-transitory computer-readable storage medium that stores instructions 1608 (which may include, for example, the instructions being executed by the processor(s) 1604). The instructions 1608 may also be referred to as program code or a computer program. The memory 1606 may also store data used by, and results computed by, the processor(s) 1604.

The wireless device 1602 may include one or more transceiver(s) 1610 that may include radio frequency (RF) transmitter and/or receiver circuitry that use the antenna(s) 1612 of the wireless device 1602 to facilitate signaling (e.g., the signaling 1634) to and/or from the wireless device 1602 with other devices (e.g., the network device 1618) according to corresponding RATs.

The wireless device 1602 may include one or more antenna(s) 1612 (e.g., one, two, four, or more). For embodiments with multiple antenna(s) 1612, the wireless device 1602 may leverage the spatial diversity of such multiple antenna(s) 1612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1602 may be accomplished according to precoding (or digital beamforming) that is applied at the wireless device 1602 that multiplexes the data streams across the antenna(s) 1612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1602 may implement analog beamforming techniques, whereby phases of the signals sent by the antenna(s) 1612 are relatively adjusted such that the (joint) transmission of the antenna(s) 1612 can be directed (this is sometimes referred to as beam steering).

The wireless device 1602 may include one or more interface(s) 1614. The interface(s) 1614 may be used to provide input to or output from the wireless device 1602. For example, a wireless device 1602 that is a UE may include interface(s) 1614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1610/antenna(s) 1612 already described) that allow for communication between the UE and other devices and may operate according to known protocols (e.g., Wi-Fi®, Bluetooth®, and the like).

The wireless device 1602 may include a frequency selective precoding module 1616. The frequency selective precoding module 1616 may be implemented via hardware, software, or combinations thereof. For example, the frequency selective precoding module 1616 may be implemented as a processor, circuit, and/or instructions 1608 stored in the memory 1606 and executed by the processor(s) 1604. In some examples, the frequency selective precoding module 1616 may be integrated within the processor(s) 1604 and/or the transceiver(s) 1610. For example, the frequency selective precoding module 1616 may be implemented by a combination of software components (e.g., executed by a DSP or a general processor) and hardware components (e.g., logic gates and circuitry) within the processor(s) 1604 or the transceiver(s) 1610.

The frequency selective precoding module 1616 may be used for various aspects of the present disclosure, for example, aspects of FIG. 1 through FIG. 14. The frequency selective precoding module 1616 may configure the wireless device 1602 to receive a TRI, a wideband TPMI, and/or subband TPMI(s) from a base station; receive RRC configuration information, MAC CE information, and/or DCI indicating whether a precoder corresponding to a wideband TPMI or a precoder corresponding to a subband TPMI is to be used for a PUSCH transmission; and/or to send a PUSCH transmission according to a precoder corresponding to the indicated subband TPMI or wideband TPMI (as the case may be) in the manner discussed herein (among other possible behaviors).

The network device 1618 may include one or more processor(s) 1620. The processor(s) 1620 may execute instructions such that various operations of the network device 1618 are performed, as described herein. The processor(s) 1620 may include one or more baseband processors implemented using, for example, a CPU, a DSP, an ASIC, a controller, an FPGA device, another hardware device, a firmware device, or any combination thereof configured to perform the operations described herein.

The network device 1618 may include a memory 1622. The memory 1622 may be a non-transitory computer-readable storage medium that stores instructions 1624 (which may include, for example, the instructions being executed by the processor(s) 1620). The instructions 1624 may also be referred to as program code or a computer program. The memory 1622 may also store data used by, and results computed by, the processor(s) 1620.

The network device 1618 may include one or more transceiver(s) 1626 that may include RF transmitter and/or receiver circuitry that use the antenna(s) 1628 of the network device 1618 to facilitate signaling (e.g., the signaling 1634) to and/or from the network device 1618 with other devices (e.g., the wireless device 1602) according to corresponding RATs.

The network device 1618 may include one or more antenna(s) 1628 (e.g., one, two, four, or more). In embodiments having multiple antenna(s) 1628, the network device 1618 may perform MIMO, digital beamforming, analog beamforming, beam steering, etc., as has been described.

The network device 1618 may include one or more interface(s) 1630. The interface(s) 1630 may be used to provide input to or output from the network device 1618. For example, a network device 1618 that is a base station may include interface(s) 1630 made up of transmitters, receivers, and other circuitry (e.g., other than the transceiver(s) 1626/antenna(s) 1628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1618 may include a frequency selective precoding module 1632. The frequency selective precoding module 1632 may be implemented via hardware, software, or combinations thereof. For example, the frequency selective precoding module 1632 may be implemented as a processor, circuit, and/or instructions 1624 stored in the memory 1622 and executed by the processor(s) 1620. In some examples, the frequency selective precoding module 1632 may be integrated within the processor(s) 1620 and/or the transceiver(s) 1626. For example, the frequency selective precoding module 1632 may be implemented by a combination of software components (e.g., executed by a DSP or a general processor) and hardware components (e.g., logic gates and circuitry) within the processor(s) 1620 or the transceiver(s) 1626.

The frequency selective precoding module 1632 may be used for various aspects of the present disclosure, for example, aspects of FIG. 1 through FIG. 14. For example, the frequency selective precoding module 1632 may configure the network device 1618 to indicate a TRI, a wideband TPMI, and/or subband TPMI(s) to a UE and/or to send RRC configuration information, MAC CE information, and/or DCI to indicate whether a precoder corresponding to a wideband TPMI or a precoder corresponding to a subband TPMI is to be used for a PUSCH transmission, in the manner discussed herein (among other possible behaviors).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising: decoding a first stage downlink control information (DCI) of two-stage DCI received from a base station that schedules a transmission on a physical uplink shared channel (PUSCH); determining, based on a reserved value for a field of the first stage DCI, to use a plurality of precoding matrices indicated by a plurality of subband transmission precoder matrix indicators (TPMIs) of a second stage DCI of the two-stage DCI to precode the transmission, wherein the reserved value comprises a value of a demodulation reference signal (DMRS) antenna port indication of the first stage DCI; decoding the second stage DCI of the two-stage DCI having the plurality subband TPMIs; precoding the transmission using the plurality of precoding matrices indicated by the plurality of subband TPMIs; and sending the transmission on the PUSCH.

2. The method of claim 1, wherein the first stage DCI is received in a first search space (SS) and the second stage DCI is received in a second SS.

3. The method of claim 1, wherein the first stage DCI is received in a primary control channel element (CCE) set (PCCE) of a search space (SS) and the second stage DCI is received in a secondary CCE set (SCCE) of the SS.

4. The method of claim 1, wherein the UE is capable of performing coherent transmission, and wherein the plurality of precoding matrices indicated by the plurality of subband TPMIs includes a coherent precoding matrix.

5. The method of claim 1, wherein the UE is capable of performing partial-coherent transmission, and wherein the plurality of precoding matrices indicated by the plurality of subband TPMIs includes a partial-coherent precoding matrix.

6. The method of claim 1, wherein the first stage DCI comprises a wideband TPMI.

7. The method of claim 1, wherein the transmission is sent on a plurality of subbands corresponding to the plurality of subband TPMIs.

8. A method of a base station, comprising: sending, to a user equipment (UE), a first stage downlink control information (DCI) of two-stage DCI that schedules a transmission on a physical uplink shared channel (PUSCH), wherein the first stage DCI is configured to indicate, via a reserved value for a field of the first stage DCI, that a plurality of precoding matrices indicated by a plurality of subband transmission precoder matrix indicators (TPMIs) of a second stage DCI of the two-stage DCI are to be used to precode the transmission, wherein the reserved value comprises a value of a demodulation reference signal (DMRS) antenna port indication of the first stage DCI; sending the second stage DCI having the plurality of subband TPMIs to the UE; and receiving, from the UE, the transmission on the PUSCH that has been precoded using the plurality of precoding matrices indicated by the plurality of subband TPMIs.

9. The method of claim 8, wherein the first stage DCI is sent in a first search space (SS) and the second stage DCI is sent in a second SS.

10. The method of claim 8, wherein the first stage DCI is sent in a primary control channel element (CCE) set (PCCE) of a search space (SS) and the second stage DCI is sent in a secondary CCE set (SCCE) of the SS.

11. The method of claim 8, wherein the plurality of precoding matrices indicated by the plurality of subband TPMIs includes a coherent precoding matrix.

12. The method of claim 8, wherein the plurality of precoding matrices indicated by the plurality of subband TPMIs includes a partial-coherent precoding matrix.

13. The method of claim 8, wherein the first stage DCI comprises a wideband TPMI.

14. The method of claim 8, wherein the transmission is received on a plurality of subbands corresponding to the plurality of subband TPMIs.

15. An apparatus of a user equipment (UE), comprising: one or more processors; and a memory storing instructions that, when executed by the one or more processors, configure the UE to: decode a first stage downlink control information (DCI) of two-stage DCI received from a base station that schedules a transmission on a physical uplink shared channel (PUSCH); determine, based on a reserved value for a field of the first stage DCI, to use a plurality of precoding matrices indicated by a plurality of subband transmission precoder matrix indicators (TPMIs) of a second stage DCI of the two-stage DCI to precode the transmission, wherein the reserved value comprises a value of a demodulation reference signal (DMRS) antenna port indication of the first stage DCI; decode the second stage DCI of the two-stage DCI having the plurality subband TPMIs; precode the transmission using the plurality of precoding matrices indicated by the plurality of subband TPMIs; and send the transmission on the PUSCH.

16. The apparatus of claim 15, wherein the first stage DCI is received in a first search space (SS) and the second stage DCI is received in a second SS.

17. The apparatus of claim 15, wherein the first stage DCI is received in a primary control channel element (CCE) set (PCCE) of a search space (SS) and the second stage DCI is received in a secondary CCE set (SCCE) of the SS.

18. The apparatus of claim 15, wherein the UE is capable of performing coherent transmission, and wherein the plurality of precoding matrices indicated by the plurality of subband TPMIs includes a coherent precoding matrix.

19. The apparatus of claim 15, wherein the UE is capable of performing partial-coherent transmission, and wherein the plurality of precoding matrices indicated by the plurality of subband TPMIs includes a partial-coherent precoding matrix.

20. The apparatus of claim 15, wherein the first stage DCI comprises a wideband TPMI.

* * * * *